(12) United States Patent
Miyauchi

(10) Patent No.: US 11,742,146 B2
(45) Date of Patent: Aug. 29, 2023

(54) MULTI-LAYER CERAMIC ELECTRONIC COMPONENT

(71) Applicant: Murata Manufacturing Co., Ltd., Nagaokakyo (JP)

(72) Inventor: Satoshi Miyauchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/681,882

(22) Filed: Feb. 28, 2022

(65) Prior Publication Data

US 2022/0285101 A1 Sep. 8, 2022

(30) Foreign Application Priority Data

Mar. 4, 2021 (JP) .................................. 2021-034507

(51) Int. Cl.
*H01G 4/30* (2006.01)
*H01G 4/232* (2006.01)
*H01G 2/06* (2006.01)
*H01G 4/12* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1218* (2013.01); *H01G 4/2325* (2013.01)

(58) Field of Classification Search
CPC ........... H01G 4/30; H01G 4/12; H01G 4/248; H01G 4/012; H01G 4/1209; H01G 4/232; H01G 4/0085; H01G 4/1227; H01G 4/2325; H01G 4/224; H01G 2/065; H01G 4/008; H01G 4/1218
See application file for complete search history.

(56) References Cited

U.S. PATENT DOCUMENTS 10,366,834 B1 * 7/2019 Lee ...................... H01G 4/1209
2010/0290172 A1 * 11/2010 Motoki ................ H01G 4/2325
427/79

(Continued)

FOREIGN PATENT DOCUMENTS

| JP | 2002-100525 A | 4/2002 |
| JP | 2005-317607 A | 11/2005 |
| JP | 2020-004832 A | 1/2020 |

*Primary Examiner* — Michael P McFadden
(74) *Attorney, Agent, or Firm* — Keating & Bennett, LLP

(57) ABSTRACT

A multi-layer ceramic electronic component includes a multi-layer ceramic electronic component main body including a multi-layer body including stacked ceramic layers, stacked internal electrode layers, first and second main surfaces, first and second side surfaces, and first and second end surfaces, first and second external electrodes respectively on sides where the first and second end surfaces are located, and first and second metallic terminals respectively connected to the first and second external electrodes. The multi-layer ceramic electronic component main body and at least portion of the first and second metallic terminals are covered with an external material. The second main surface is connected to the metallic terminals. The first and second external electrodes cover a portion of the second main surface. A gap is provided between the multi-layer body and tips of the first and second external electrodes. The external material is in the gap.

19 Claims, 11 Drawing Sheets

(51) Int. Cl.
    *H01G 4/008*     (2006.01)
    *H01G 4/012*     (2006.01)

(56) References Cited

U.S. PATENT DOCUMENTS

| | | | |
|---|---|---|---|
| 2012/0300361 A1* | 11/2012 | Togashi | H01G 4/12 156/89.12 |
| 2013/0020913 A1* | 1/2013 | Shirakawa | H01G 4/224 336/200 |
| 2015/0022945 A1* | 1/2015 | Park | H01G 4/2325 156/89.18 |
| 2017/0154731 A1* | 6/2017 | Tahara | H01G 4/232 |
| 2017/0164479 A1* | 6/2017 | Park | H01G 2/065 |
| 2017/0256359 A1* | 9/2017 | Masunari | H01G 4/005 |
| 2017/0330689 A1* | 11/2017 | Hatanaka | H01G 2/065 |
| 2019/0131076 A1* | 5/2019 | Fukumura | H01G 4/232 |
| 2019/0164695 A1* | 5/2019 | Cho | H01G 4/005 |
| 2019/0385795 A1* | 12/2019 | Yang | H01G 4/30 |
| 2020/0006002 A1 | 1/2020 | Itamochi | |

* cited by examiner

III-III SECTIONAL VIEW

IV-IV SECTIONAL VIEW

V-V SECTIONAL VIEW

ENLARGED VIEW OF PORTION a

XIII-XIII SECTIONAL VIEW

ENLARGED VIEW OF PORTION b

XVII–XVII SECTIONAL VIEW

XVIII–XVIII SECTIONAL VIEW

XIX-XIX SECTIONAL VIEW

XX-XX SECTIONAL VIEW

ENLARGED VIEW OF PORTION c

MULTI-LAYER CERAMIC ELECTRONIC COMPONENT

CROSS REFERENCE TO RELATED APPLICATIONS

This application claims the benefit of priority to Japanese Patent Application No. 2021-034507 filed on Mar. 4, 2021. The entire contents of this application are hereby incorporated herein by reference.

BACKGROUND OF THE INVENTION

1. Field of the Invention

The present invention relates to a multi-layer ceramic electronic component including a metallic terminal, and particularly relates to a multi-layer ceramic electronic component including two metallic terminals connected to an external electrode of a multi-layer ceramic electronic component main body.

2. Description of the Related Art

In recent years, performance improvement of hybrid cars and EVs has been actively attempted for environmental load reduction by automakers in Japan and other countries. In such movements, an increase in battery voltage (from 400 V to 800 V) has been promoted mainly in Europe to reduce charging time and harness weight. On the other hand, such a voltage increase increases the possibility of the occurrence of creeping discharge on the surface of a substrate or an electronic component, and therefore there is a demand for a technique for preventing creeping discharge.

For example, Japanese Patent Laid-Open No. 2002-100525 discloses an external material (resin) molded-type middle- to high-voltage multi-layer ceramic capacitor with metallic terminals. The middle- to high-voltage multi-layer ceramic capacitor disclosed in Japanese Patent Laying-Open No. 2002-100525 is a surface-mountable middle- to high-voltage multi-layer ceramic capacitor that is less likely to cause creeping discharge due to abnormal voltage and further has excellent durability against mechanical stress such as deflection.

However, the middle- to high-voltage multi-layer ceramic capacitor disclosed in Japanese Patent Laying-Open No. 2002-100525 has a problem that when the capacitor is mounted on the surface of a substrate by reflow soldering, solder or plating is melted so that boundary separation between the exterior material (molding resin) and the surface of a multi-layer body starts from the tip of an external electrode.

This will be described in more detail with reference to FIG. 22. FIG. 22 is a partially-enlarged LT sectional view of a conventional multi-layer ceramic electronic component. In FIG. 22, a metallic terminal 30 is not shown. Further, in FIG. 22, an external electrode 26 has a three-layer structure including a base electrode layer 27, an Ni plating layer 28, and an Sn plating layer 29. As shown in FIG. 22, when the multi-layer ceramic electronic component is mounted on the surface of a substrate by reflow soldering, a bonding material (solder) or Sn plating layer 29 is melted so that stress is generated during melting (black arrows in FIG. 22). Particularly, stress is concentrated on the contact point between a multi-layer body and the external electrode (white arrows in FIG. 22) so that boundary separation between the surface of the multi-layer body and an external material (molding resin) may start from the tip of the external electrode.

Even when the multi-layer ceramic electronic component has an external material (resin)-molded structure that is less likely to cause creeping discharge, separation between the surface of the multi-layer body and the external material (resin) may cause creeping discharge along the surface of the multi-layer body after separation, which may result in a critical defect of a product. Therefore, there is a demand for a technique for stably preventing separation between the surface of the multi-layer body and the external material (resin) even after reflow soldering.

SUMMARY OF THE INVENTION

Preferred embodiments of the present invention provide multi-layer ceramic electronic components that are each able to prevent separation between a multi-layer body and an external material.

A multi-layer ceramic electronic component according to a preferred embodiment of the present invention includes a multi-layer ceramic electronic component main body including a multi-layer body including a plurality of stacked ceramic layers and a plurality of stacked internal electrode layers, and including a first main surface and a second main surface opposed to each other in a height direction, a first side surface and a second side surface opposed to each other in a width direction orthogonal or substantially orthogonal to the height direction, and a first end surface and a second end surface opposed to each other in a length direction orthogonal or substantially orthogonal to the height direction and the width direction, a first external electrode on a side where the first end surface is located, and a second external electrode on a side where the second end surface is located, a first metallic terminal connected to the first external electrode, and a second metallic terminal connected to the second external electrode, wherein the multi-layer ceramic electronic component main body and at least a portion of the first metallic terminal and the second metallic terminal are covered with an external material, the second main surface is connected to the metallic terminals, the first external electrode and the second external electrode cover a portion of the second main surface, a gap is provided between the multi-layer body and each of tips of the first external electrode and the second external electrode that cover a portion of the second main surface, and the external material is positioned in the gap.

According to preferred embodiments of the present invention, it is possible to provide multi-layer ceramic electronic components that are each able to prevent separation between a multi-layer body and an external material.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

1. Multi-Layer Ceramic Electronic Component

First Preferred Embodiment

Figure 1:
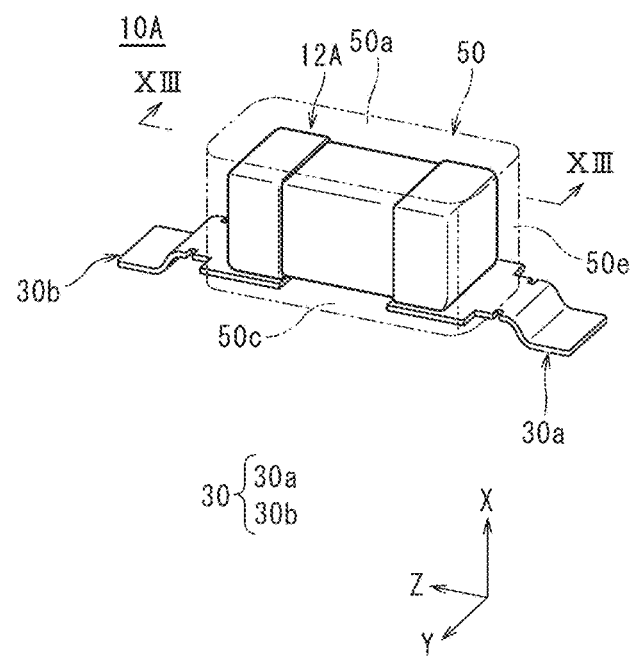
FIG. 1 is a perspective view showing an example of a multi-layer ceramic electronic component according to a first preferred embodiment of the present invention.
Figure 2:
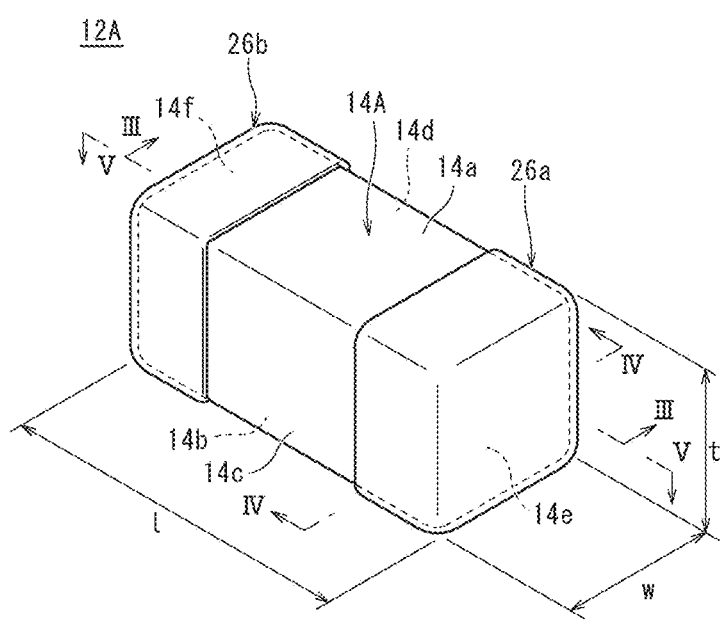
FIG. 2 is a perspective view showing a multi-layer ceramic electronic component main body used in the multi-layer ceramic electronic component shown in FIG. 1.
Figure 3:
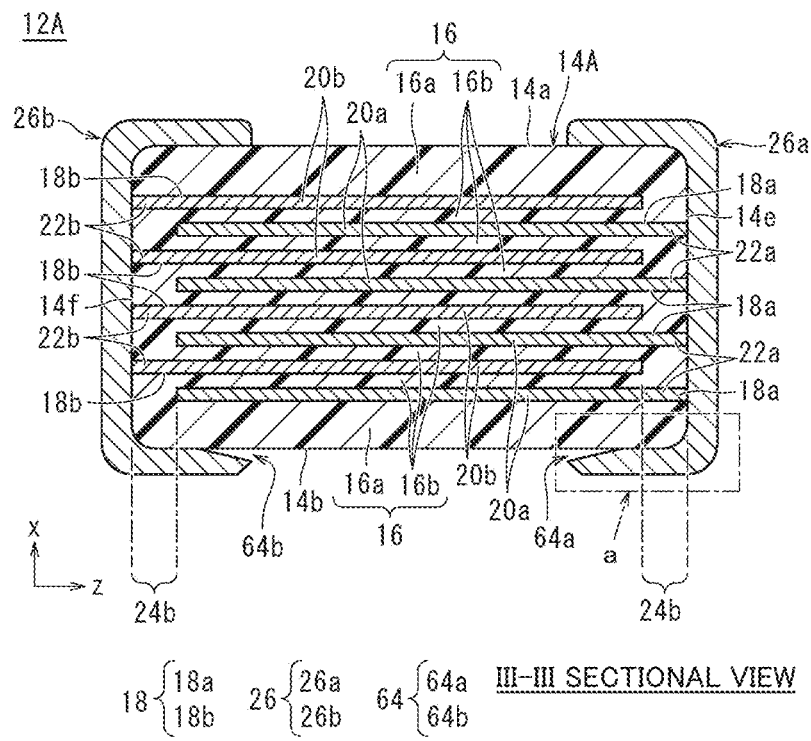
FIG. 3 is a sectional view of the multi-layer ceramic electronic component main body taken along a line III-III shown in FIG. 2.
Figure 4:
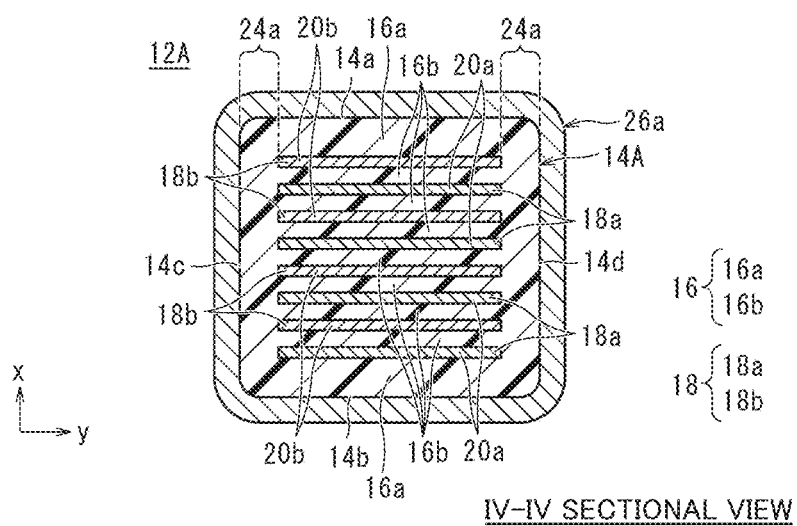
FIG. 4 is a sectional view of the multi-layer ceramic electronic component main body taken along a line IV-IV shown in FIG. 2.
Figure 5:
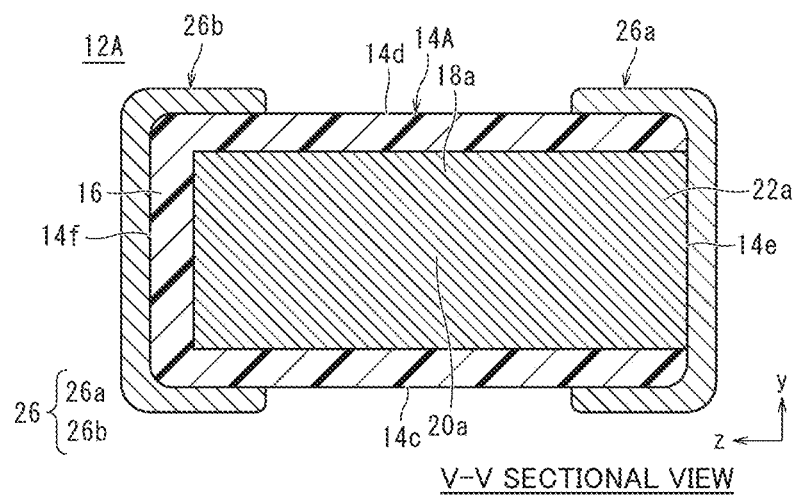
FIG. 5 is a sectional view of the multi-layer ceramic electronic component main body taken along a line V-V shown in FIG. 2.
Figure 6:
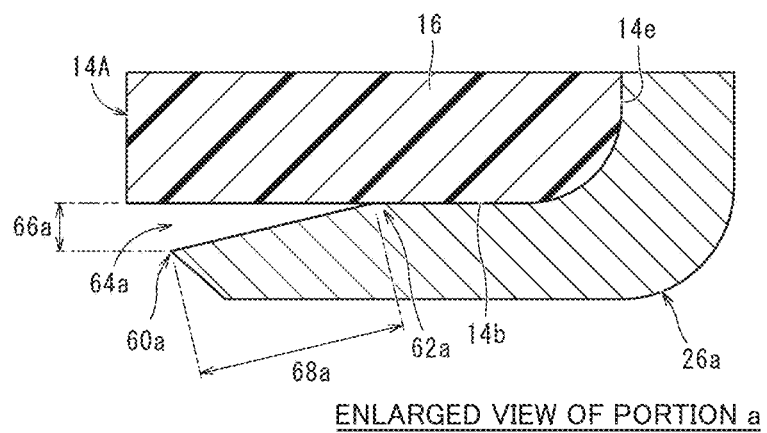
FIG. 6 is an enlarged view of a portion a shown in FIG. 3.
Figure 7:
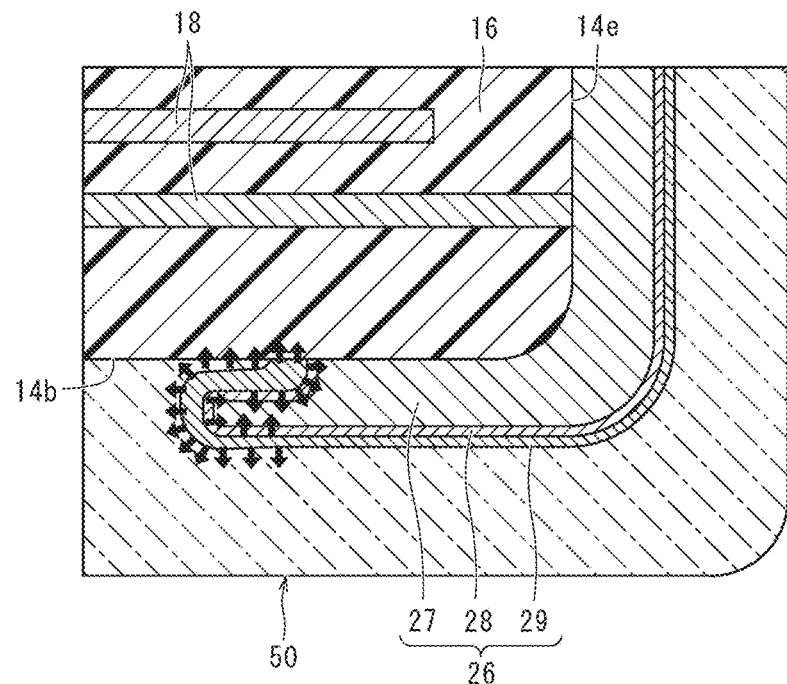
FIG. 7 is a partially-enlarged LT sectional view of a multi-layer ceramic electronic component according to the first preferred embodiment of the present invention.
Figure 8:
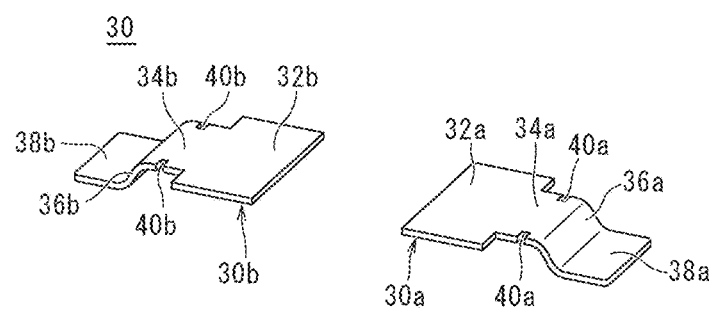
FIG. 8 is a perspective view showing metallic terminals of the multi-layer ceramic electronic component according to the first preferred embodiment of the present invention.
Figure 9:
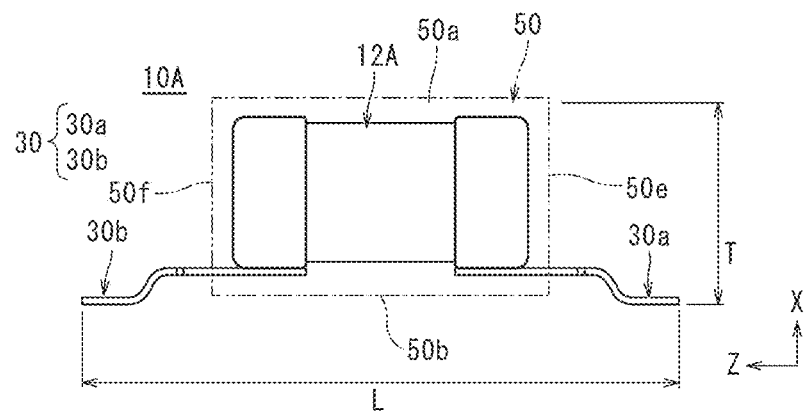
FIG. 9 is a front view of the multi-layer ceramic electronic component shown in FIG. 1.
Figure 10:
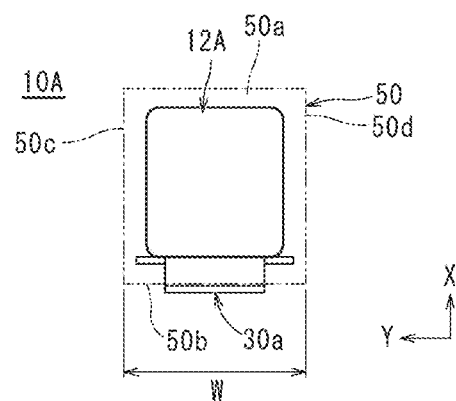
FIG. 10 is a side view of the multi-layer ceramic electronic component shown in FIG. 1.
Figure 11:
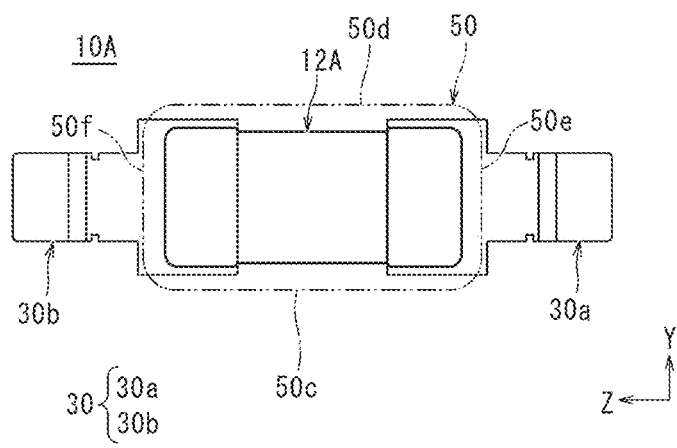
FIG. 11 is a top view of the multi-layer ceramic electronic component shown in FIG. 1.
Figure 12:
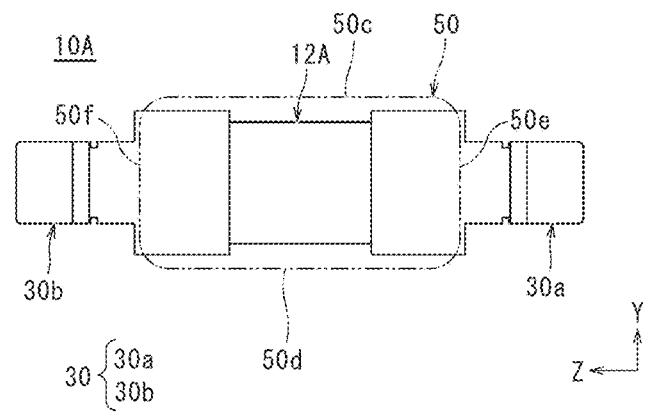
FIG. 12 is a bottom view of the multi-layer ceramic electronic component shown in FIG. 1.
Figure 13:
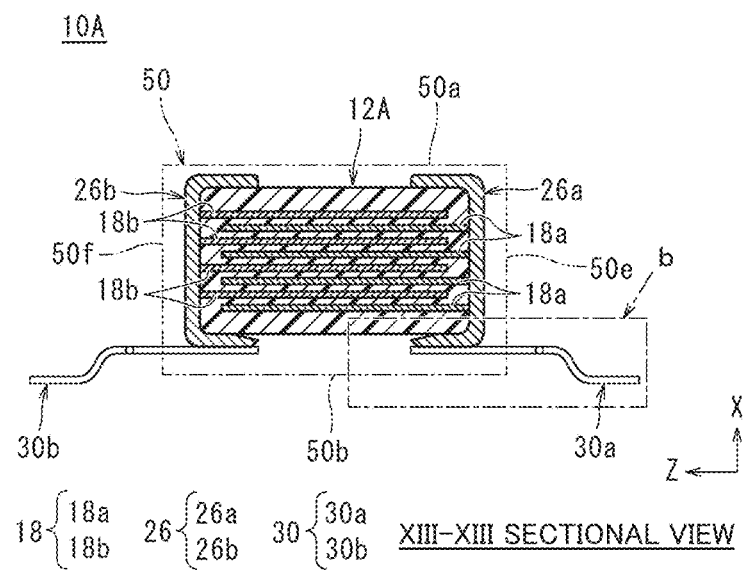
FIG. 13 is a sectional view of the multi-layer ceramic electronic component taken along a line XIII-XIII shown in FIG. 1.
Figure 14:
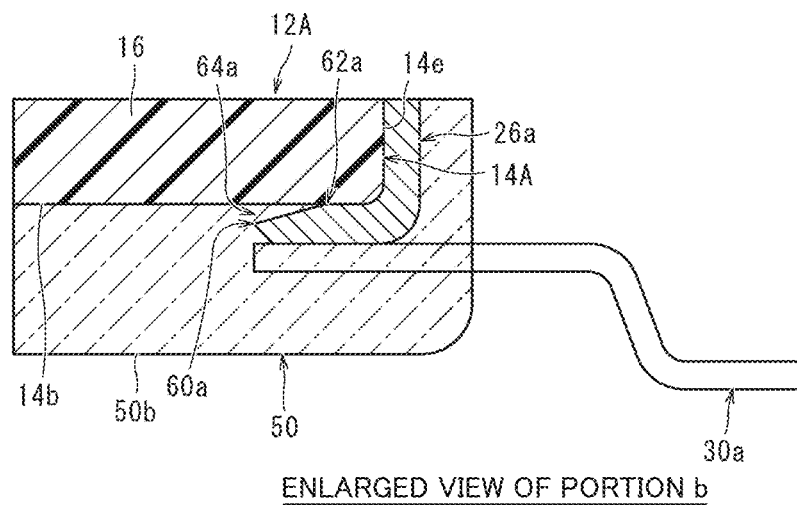
FIG. 14 is an enlarged view of a portion b shown in FIG. 13.

A multi-layer ceramic electronic component according to a first preferred embodiment of the present invention will be described. FIG. 1 is a perspective view showing an example of the multi-layer ceramic electronic component according to the first preferred embodiment of the present invention. FIG. 2 is a perspective view showing a multi-layer ceramic electronic component main body used in the multi-layer ceramic electronic component shown in FIG. 1. FIG. 3 is a sectional view of the multi-layer ceramic electronic component main body taken along a line III-III shown in FIG. 2. FIG. 4 is a sectional view of the multi-layer ceramic electronic component main body taken along a line IV-IV shown in FIG. 2. FIG. 5 is a sectional view of the multi-layer ceramic electronic component main body taken along a line V-V shown in FIG. 2. FIG. 6 is an enlarged view of a portion a shown in FIG. 3. FIG. 7 is a partially-enlarged LT sectional view of a multi-layer ceramic electronic component 10A according to the first preferred embodiment of the present invention. FIG. 8 is a perspective view showing metallic terminals of the multi-layer ceramic electronic component according to the first preferred embodiment of the present invention. FIG. 9 is a front view of the multi-layer ceramic electronic component shown in FIG. 1. FIG. 10 is a side view of the multi-layer ceramic electronic component shown in FIG. 1. FIG. 11 is a top view of the multi-layer ceramic electronic component shown in FIG. 1. FIG. 12 is a bottom view of the multi-layer ceramic electronic component shown in FIG. 1. FIG. 13 is a sectional view of the multi-layer ceramic electronic component taken along a line XIII-XIII shown in FIG. 1. FIG. 14 is an enlarged view of a portion b shown in FIG. 13.

(1) Multi-Layer Ceramic Electronic Component Main Body

A multi-layer ceramic electronic component 10A according to the first preferred embodiment of the present invention includes a multi-layer ceramic electronic component main body 12A. Multi-layer ceramic electronic component main body 12A includes a cuboid-shaped multi-layer body 14A and an external electrode 26. Further, multi-layer ceramic electronic component 10A includes a metallic terminal 30 connected to external electrode 26 of multi-layer ceramic electronic component main body 12A and an external material 50 covering multi-layer body 14A, external electrode 26, and a portion of metallic terminal 30.

Multi-layer ceramic electronic component main body 12A includes multi-layer body 14A including a plurality of stacked ceramic layers 16, a first main surface 14a and a second main surface 14b opposed to each other in a height direction x, a first side surface 14c and a second side surface 14d opposed to each other in a width direction y orthogonal or substantially orthogonal to height direction x, and a first end surface 14e and a second end surface 14f opposed to each other in a length direction z orthogonal or substantially orthogonal to height direction x and width direction y.

Multi-layer body 14A includes a plurality of stacked ceramic layers 16 and a plurality of internal electrode layers 18. Further, multi-layer body 14A includes first main surface 14a and second main surface 14b opposed to each other in height direction x, first side surface 14c and second side surface 14d opposed to each other in width direction y orthogonal or substantially orthogonal to height direction x, and first end surface 14e and second end surface 14f opposed to each other in length direction z orthogonal or substantially orthogonal to height direction x and width direction y. First main surface 14a and second main surface 14b of multi-layer body 14A refer to surfaces parallel or substantially parallel to a surface (mounting surface) on which multi-layer ceramic electronic component main body 12A is to be mounted. In the present preferred embodiment, second main surface 14b of multi-layer body 14A faces the surface (mounting surface) on which multi-layer ceramic electronic component main body 12A is mounted.

The corners and ridge lines of multi-layer body 14A are preferably rounded. The corner refers to a portion where three adjacent surfaces of multi-layer body 14A meet, and the ridge line refers to a portion where two adjacent surfaces of multi-layer body 14A meet.

The size of multi-layer ceramic electronic component main body 12A including multi-layer body 14A and external electrode 26 in length direction z is defined as a size l, the size of multi-layer ceramic electronic component main body 12A including multi-layer body 14A and external electrode 26 in height direction x is defined as a size t, and the size of multi-layer ceramic electronic component main body 12A including multi-layer body 14A and external electrode 26 in width direction y is defined as a size w.

Multi-layer body 14A includes an outer layer portion 16a including only ceramic layers 16 and an inner layer portion 16b including ceramic layers 16 and internal electrode layers 18. Outer layer portion 16a is located in a plane orthogonal or substantially orthogonal to height direction x as a stacking direction of multi-layer body 14A, and is an assembly of ceramic layers 16 located between first main surface 14a of multi-layer body 14 and internal electrode layer 18 nearest to first main surface 14a and ceramic layers 16 located between second main surface 14b and internal electrode layer 18 nearest to second main surface 14b. An area sandwiched between both outer layer portions 16a corresponds to inner layer portion 16b.

Ceramic layers 16 may be made of, for example, a dielectric material. As such a dielectric material, for example, a dielectric ceramic including $BaTiO_3$, $CaTiO_3$, $SrTiO_3$, $CaZrO_3$ or the like as a component may be used. Alternatively, for example, a dielectric material including, in addition to such a component, a component such as an Mn compound, an Fe compound, a Cr compound, a Co compound, or an Ni compound in an amount less than that of a main component may be used.

When a piezoelectric ceramic is used for multi-layer body 14A, multi-layer ceramic electronic component main body 12A defines and functions as a piezoelectric component. Specific examples of the piezoelectric ceramic material include PZT (lead zirconate titanate)-based ceramic materials.

When a semiconductor ceramic is used for multi-layer body 14A, multi-layer ceramic electronic component main body 12A defines and functions as a thermistor. Specific examples of the semiconductor ceramic material include spinel-based ceramic materials.

When a magnetic ceramic is used for multi-layer body 14A, multi-layer ceramic electronic component main body 12A defines and functions as an inductor. When multi-layer ceramic electronic component main body 12A defines and functions as an inductor, internal electrode layer 18 is a coiled conductor. Specific examples of the magnetic ceramic material include ferrite ceramic materials.

The thickness of each of ceramic layers 16 after firing is preferably greater than or equal to about 0.5 μm and less than or equal to about 20.0 μm, for example.

Multi-layer body 14A includes internal electrode layers 18. Internal electrode layers 18 include a plurality of first internal electrode layers 18a and a plurality of second internal electrode layers 18b. First internal electrode layers 18a and second internal electrode layers 18b are alternately stacked such that ceramic layers 16 are each interposed between first internal electrode layer 18a and second internal electrode layer 18b. More specifically, first internal electrode layers 18a and second internal electrode layers 18b are each provided on different ceramic layers 16.

Each of first internal electrode layers 18a includes a first opposite electrode portion 20a opposed to second internal electrode layer 18b and a first extraction electrode portion 22a located on one end side of first internal electrode layer 18a and extending from the end of first opposite electrode portion 20a to first end surface 14e of multi-layer body 14A. The end of first extraction electrode portion 22a is exposed at first end surface 14e.

Each of second internal electrode layers 18b includes a second opposite electrode portion 20b opposed to first internal electrode layer 18a and a second extraction electrode portion 22b located on one end side of second internal electrode layer 18b and extending from the end of second opposite electrode portion 20b to second end surface 14f of multi-layer body 14A. The end of second extraction electrode portion 22b is exposed at second end surface 14f.

First opposite electrode portion 20a and second opposite electrode portion 20b create electrical characteristics (e.g., capacitance).

Multi-layer body 14A includes a side portion (W gap) 24a of multi-layer body 14A between one ends of first opposite electrode portions 20a and second opposite electrode portions 20b, where first internal electrode layers 18a and second internal electrode layers 18b are opposed to each other, in width direction y and first side surface 14c and between the other ends of first opposite electrode portions 20a and second opposite electrode portions 20b in width direction y and second side surface 14d. Further, multi-layer body 14A includes an end portion (L gap) 24b of multi-layer body 14A between the ends of first internal electrode layers 18a on the opposite side from first extraction electrode portions 22a and second end surface 14f and between the ends of second internal electrode layers 18b on the opposite side from second extraction electrode portions 22b and first end surface 14e.

Multi-layer body 14A includes first internal electrode layers 18a and second internal electrode layers 18b, an opposite electrode portion 20 where first internal electrode layers 18a and second internal electrode layers 18b are opposed to each other, outer layer portion 16a of multi-layer body 14A located between opposite electrode portion 20 and first main surface 14a and between opposite electrode portion 20 and second main surface 14b, and an end portion (L gap) 24b of multi-layer body 14A located between opposite electrode portion 20 and first end surface 14e and between opposite electrode portion 20 and second end surface 14f and including extraction electrode portions 22 of first internal electrode layers 18a or second internal electrode layers 18b.

Internal electrode layers 18 may be made of, for example, a metal such as Ni, Cu, Ag, Pd, or Au or an alloy including at least one of these metals, such as Ag—Pd alloy. Internal electrode layers 18 may further include dielectric particles with the same composition as ceramic included in ceramic layers 16.

The thickness of each of first internal electrode layers 18a and second internal electrode layers 18b is preferably greater than or equal to about 0.1 μm and less than or equal to about 2.0 μm, for example.

External electrode 26 includes a first external electrode 26a and a second external electrode 26b.

First external electrode 26a is preferably provided on first end surface 14e and at least a portion of second main surface 14b.

Second external electrode 26b is preferably provided on second end surface 14f and at least a portion of second main surface 14b.

External electrode 26 includes a base electrode layer and a plating layer on the base electrode layer. The base electrode layer includes a baked layer.

The baked layer includes glass and a metal. As the glass of the baked layer, for example, at least one selected from among B, Si, Ba, Mg, Al, Li, and the like is included. As the metal of the baked layer, for example, at least one selected from among Cu, Ni, Ag, Pd, an Ag—Pd alloy, Au, and the like is included. The baked layer may include two or more layers. The baked layer is formed by applying an electrically conductive paste including glass and a metal onto multi-layer body 14A and baking it. The baked layer may be formed at the same time when ceramic layers 16 and internal electrode layers 18 are fired, or may be formed by baking after ceramic layers 16 and internal electrode layers 18 are fired.

The baked layer preferably has a thickness (thickness of the thickest portion) of greater than or equal to about 10 μm and less than or equal to about 50 μm, for example.

The plating layer covers the base electrode layer. The plating layer preferably includes, for example, at least one metal or alloy selected from among Cu, Ni, Sn, Ag, Pd, Ag—Pd alloy, Au, and the like. The plating layer may include two or more layers. In this case, the plating layer preferably has a two-layer structure including an Ni plating layer and an Sn plating layer, for example. When an Ni plating layer covers the surface of the base electrode layer, it is possible to prevent the base electrode layer from being eroded by solder used as a bonding material when multi-layer ceramic electronic component main body 12A is bonded to metallic terminal 30. Further, when an Sn plating layer is provided on the surface of the Ni plating layer, wettability of solder used as a bonding material is improved when multi-layer ceramic electronic component main body 12A is bonded to metallic terminal 30, which make it easy to perform mounting.

The thickness of one plating layer is preferably greater than or equal to about 1 μm and less than or equal to about 15 μm, for example.

A gap 64 is provided between external electrode 26 and second main surface 14b of multi-layer body 14A. More specifically, a tip 60a of first external electrode 26a located at second main surface 14b of multi-layer body 14A is separated from second main surface 14b so that a first gap 64a is provided. Further, a tip 60b of second external electrode 26b located at second main surface 14b is separated from second main surface 14b so that a second gap 64b is provided.

Gap 64 is defined by first gap 64a and second gap 64b.

First gap 64a is an area between second main surface 14b of multi-layer body 14A and first external electrode 26a. First external electrode 26a is in contact with second main surface 14b of multi-layer body 14A at a first contact portion 62a. An area between tip 60a of first external electrode 26a and second main surface 14b of multi-layer body 14A in height direction x is defined as a first opening 66a, and a portion between tip 60a of first external electrode 26a and first contact portion 62a is defined as a first separated portion 68a. The length of first opening 66a of first gap 64a in height direction x is preferably greater than or equal to about 0.2 μm and less than or equal to about 30.0 μm, for example. This makes it possible to prevent separation between second main surface 14b of multi-layer body 14A and external material 50 because stress to be generated is applied in a vertical direction in a good balance. The length of first separated portion 68a of first gap 64a is preferably greater than or equal to about 2 μm and less than or equal to about 300 μm, for example. This makes it possible to prevent separation between second main surface 14b of multi-layer body 14A and external material 50 because stress to be generated is applied in a vertical direction in a good balance.

Second gap 64b is an area between second main surface 14b of multi-layer body 14A and second external electrode 26b. Second external electrode 26b is in contact with second main surface 14b of multi-layer body 14A at a second contact portion 62b. An area between tip 60b of second external electrode 26b and second main surface 14b of multi-layer body 14A in height direction x is defined as a second opening 66b, and a portion between tip 60b of second external electrode 26b and second contact portion 62b is defined as a second separated portion 68b. The length of second opening 66b of second gap 64b in height direction x is preferably greater than or equal to about 0.2 μm and less than or equal to about 30.0 μm, for example. This makes it possible to prevent separation between second main surface 14b of multi-layer body 14A and external material 50 because stress to be generated is applied in a vertical direction in a good balance. The length of second separated portion 68b of second gap 64b is preferably greater than or equal to about 2 μm and less than or equal to about 300 μm, for example. This makes it possible to prevent separation between second main surface 14b of multi-layer body 14A and external material 50 because stress to be generated is applied in a vertical direction in a good balance.

FIG. 7 is a partially-enlarged LT sectional view of the multi-layer ceramic electronic component 10A according to the first preferred embodiment of the present invention. In FIG. 7, metallic terminal 30 is not shown. In FIG. 7, external electrode 26 includes a three-layer structure including a base electrode layer 27, an Ni plating layer 28, and an Sn plating layer 29.

As shown in FIG. 7, when the multi-layer ceramic electronic component 10A is mounted on the surface of a substrate by reflow soldering, a bonding material (solder) or Sn plating layer 29 is melted so that stress is generated during melting (black arrows in FIG. 7). However, gap 64 provided between second main surface 14b of multi-layer body 14A and external electrode 26 cancels out stress generated when a bonding material (solder) or Sn plating layer 29 is melted, in a vertical direction relative to separated base electrode layer 27, which makes it possible to stably achieve a state where multi-layer body 14A and external material 50 are not separated from each other even after reflow soldering.

As described above, according to the prior art, there is a case where a bonding material (solder) or plating is melted when a multi-layer ceramic electronic component is mounted on the surface of a substrate by reflow soldering, and therefore boundary separation between the surface of a multi-layer body and an external material starts from the tip of each external electrode so that creeping discharge occurs on the surface of the multi-layer body after separation. This may result in a critical defect of a product. However, as shown in FIG. 7, gap 64 provided between multi-layer body 14A and external electrode 26 cancels out stress generated when a bonding material (solder) or Sn plating layer 29 is melted, in a vertical direction relative to separated base electrode layer 27, which makes it possible to stably achieve a state where multi-layer body 14A and external material 50 are not separated from each other even after reflow soldering.

Further, in multi-layer ceramic electronic component main body 12A, first external electrode 26a and second external electrode 26b facing gap 64 preferably include a plating layer. This reduces the moisture absorbency of first external electrode 26a and second external electrode 26b. Therefore, even when external material 50 absorbs moisture before reflow soldering, separation between second main surface 14b and external material 50 can be prevented because stress is applied to tip 60a of first external electrode 26a and tip 60b of second external electrode 26b in a vertical direction in a good balance.

(2) Metallic Terminal

Metallic terminal 30 is connected to external electrode 26 on both end surfaces of multi-layer ceramic electronic component main body 12A with a bonding material.

Metallic terminal 30 includes a first metallic terminal 30a and a second metallic terminal 30b.

In multi-layer ceramic electronic component main body 12A, first metallic terminal 30a is connected to first external electrode 26a with a bonding material. More specifically, first metallic terminal 30a is connected to first external electrode 26a located on second main surface 14b of multi-layer ceramic electronic component main body 12A.

In multi-layer ceramic electronic component main body 12A, second metallic terminal 30b is connected to second external electrode 26b with a bonding material. More specifically, second metallic terminal 30b is connected to second external electrode 26b located on second main surface 14b of multi-layer ceramic electronic component main body 12A.

Metallic terminal 30 is provided to mount multi-layer ceramic electronic component main body 12A on the surface of a mounting substrate. As metallic terminal 30, for example, a plate-shaped lead frame is used. Metallic terminal 30 defined by such a plate-shaped lead frame includes a first main surface to be connected to external electrode 26, a second main surface opposed to the first main surface (surface on the opposite side from multi-layer ceramic electronic component main body 12A), and a peripheral surface defining a thickness between the first main surface and the second main surface.

First metallic terminal 30a includes a first terminal connecting portion 32a to be connected to first external electrode 26a, a first extension portion 34a connected to first terminal connecting portion 32a and extending in a direction parallel or substantially parallel to second main surface 14b so that a gap is created between second main surface 14b and a mounting surface, a second extension portion 36a connected to first extension portion 34a and extending toward the mounting surface located on the opposite side from multi-layer ceramic electronic component main body 12A, and a first mounting portion 38a connected to second extension portion 36a to be mounted on a mounting substrate. However, the structure of each of the extension portions is not limited to the above structure, and first metallic terminal 30a may further include a curved extension portion.

Second metallic terminal 30b includes a second terminal connecting portion 32b to be connected to second external electrode 26b, a third extension portion 34b connected to second terminal connecting portion 32b and extending in a direction parallel or substantially parallel to second main surface 14b so that a gap is created between second main surface 14b and a mounting surface, a fourth extension portion 36b connected to third extension portion 34b and extending toward the mounting surface located on the opposite side from multi-layer ceramic electronic component main body 12A, and a second mounting portion 38b connected to fourth extension portion 36b to be mounted on a mounting substrate. However, the structure of each of the extension portions is not limited to the above structure, and second metallic terminal 30b may further include a curved extension portion.

(a) First Terminal Connecting Portion and Second Terminal Connecting Portion

First terminal connecting portion 32a of first metallic terminal 30a is a portion to be connected to first external electrode 26a located on second main surface 14b of multi-layer ceramic electronic component main body 12A. First terminal connecting portion 32a is not particularly limited as long as it is connected so as to correspond to first external electrode 26a of multi-layer ceramic electronic component main body 12A, but preferably covers the entire or substantially the entire surface of first external electrode 26a located on second main surface 14b. In other words, first terminal connecting portion 32a of first metallic terminal 30a preferably has a length corresponding to the length of first external electrode 26a located on second main surface 14b. This increases the contact area between external electrode 26 and metallic terminal 30 connected to each other with a bonding material, which makes it possible to achieve lower thermal resistance.

Second terminal connecting portion 32b of second metallic terminal 30b is a portion to be connected to second external electrode 26b located on second main surface 14b of multi-layer ceramic electronic component main body 12A. Second terminal connecting portion 32b is not particularly limited as long as it is connected so as to correspond to second external electrode 26b of multi-layer ceramic electronic component main body 12A, but preferably covers the entire or substantially the entire surface of second external electrode 26b located on second main surface 14b. In other words, second terminal connecting portion 32b of second metallic terminal 30b preferably has a length corresponding to the length of second external electrode 26b located on second main surface 14b. This increases the contact area between external electrode 26 and metallic terminal 30 connected to each other with a bonding material, which makes it possible to achieve lower thermal resistance.

(b) First Extension Portion and Third Extension Portion

First extension portion 34a of first metallic terminal 30a is connected to first terminal connecting portion 32a and extends in a direction parallel or substantially parallel to second main surface 14b so as to be spaced away from multi-layer ceramic electronic component main body 12A. This makes it possible to increase a range subjected to molding with external material 50, thus maintaining an insulating surface distance (creeping distance) between conductors. Further, it is possible to provide a margin for bending of the terminal.

The length of first extension portion 34a of first metallic terminal 30a along length direction Z of multi-layer ceramic electronic component 10A is preferably shorter than that of first terminal connecting portion 32a along length direction Z of multi-layer ceramic electronic component 10A. More specifically, the length is preferably, for example, greater than or equal to about 50% and less than or equal to about 90% of the length of first terminal connecting portion 32a along length direction Z of multi-layer ceramic electronic component 10A. This makes it possible to provide a resin inlet to mold with external material 50 on the bottom side, thus achieving optimum resin flowability. Further, it is possible to reduce the amount of material of the metallic terminal, thus achieving the advantageous effect of reducing costs. The length of first extension portion 34a of first metallic terminal 30a along width direction Y of multi-layer ceramic electronic component 10A may be the same or substantially the same as that of first terminal connecting portion 32*a*, but may be gradually reduced stepwise or may be reduced by tapering.

A portion of the surface of first extension portion 34*a* may be processed to form a recess so that a base material of first metallic terminal 30*a* is exposed at the processed portion. This makes it possible, even if a bonding material on first terminal connecting portion 32*a* is melted, to stop the outflow of the bonding material because the wettability of the bonding material is reduced by exposure of the base material of first metallic terminal 30*a* in the recessed processed portion, thus preventing the melted bonding material from flowing out of external material 50.

Further, first extension portion 34*a* may include a notch. This makes it possible to reduce the amount of material of the metallic terminal, thus achieving the advantageous effect of reducing costs. Further, it is possible to obtain the advantageous effect of relaxing stress from a substrate after substrate mounting.

Notches for bending 40*a* may be provided at a portion of the both ends of first extension portion 34*a* in width direction Y of multi-layer ceramic electronic component 10A. This makes it possible to provide clearance to allow the material of first metallic terminal 30*a* to escape during bending of first metallic terminal 30*a*, thus achieving excellent bendability.

Third extension portion 34*b* of second metallic terminal 30*b* is connected to second terminal connecting portion 32*b* and extends in a direction parallel or substantially parallel to second main surface 14*b* so as to be spaced away from multi-layer ceramic electronic component main body 12A. This makes it possible to increase a range subjected to molding with external material 50, thus maintaining an insulating surface distance (creeping distance) between conductors. Further, it is possible to provide a margin for bending of the terminal.

The length of third extension portion 34*b* of second metallic terminal 30*b* along length direction Z of multi-layer ceramic electronic component 10A is preferably shorter than that of second terminal connecting portion 32*b* along length direction Z of multi-layer ceramic electronic component 10A. More specifically, the length is preferably, for example, greater than or equal to about 50% and less than or equal to about 90% of the length of second terminal connecting portion 32*b* along length direction Z of multi-layer ceramic electronic component 10A. This makes it possible to provide a resin inlet to mold with external material 50 on the bottom side, thus achieving optimum resin flowability. Further, it is possible to reduce the amount of material of the metallic terminal, thus achieving the advantageous effect of reducing costs. The length of third extension portion 34*b* of second metallic terminal 30*b* along width direction Y of multi-layer ceramic electronic component 10A may be the same or substantially the same as that of second terminal connecting portion 32*b*, but may be gradually reduced stepwise or may be reduced by tapering.

A portion of the surface of third extension portion 34*b* may be processed to form a recess so that a base material of second metallic terminal 30*b* is exposed at the processed portion. This makes it possible, even if a bonding material on second terminal bonding portion 32*b* is melted, to stop the outflow of the bonding material because the wettability of the bonding material is reduced by exposure of the base material of second metallic terminal 30*b* in the recessed processed portion, thus preventing the melted bonding material from flowing out of external material 50.

Further, third extension portion 34*b* may include a notch. This makes it possible to reduce the amount of material of the metallic terminal, thus achieving the advantageous effect of reducing costs. Further, it is possible to obtain the advantageous effect of relaxing stress from a substrate after substrate mounting.

Notches for bending 40*b* may be provided at a portion of the both ends of third extension portion 34*b* in width direction Y of multi-layer ceramic electronic component 10A. This makes it possible to provide clearance to allow the material of second metallic terminal 30*b* to escape during bending of second metallic terminal 30*b*, thus achieving excellent bendability.

(c) Second Extension Portion and Fourth Extension Portion

Second extension portion 36*a* of first metallic terminal 30*a* is connected to first extension portion 34*a* and extends toward a mounting surface so that a gap is created between second main surface 14*b* to be opposed to the mounting surface and the mounting surface. This makes it possible to increase a distance from a mounting substrate, thus obtaining the advantageous effect of relaxing stress from the mounting substrate. Further, it is possible to increase the bottom thickness of external material 50, thus improving insulating properties. More specifically, second extension portion 36*a* curves from the end of first extension portion 34*a* and extends toward the mounting surface. The curved portion may have an obtuse angle or approximately a right angle.

The length of second extension portion 36*a* of first metallic terminal 30*a* along width direction Y of multi-layer ceramic electronic component 10A is not particularly limited, but is preferably equal or substantially equal to the length of first extension portion 34*a* along width direction Y of multi-layer ceramic electronic component 10A.

Second extension portion 36*a* extending toward the mounting surface preferably has a length such that, for example, a gap of greater than or equal to about 0.15 mm and less than or equal to about 2 mm is created between the surface of external material 50 (which will be described later) opposed to the mounting surface and the mounting surface. When multi-layer ceramic electronic component main body 12A covered with external material 50 is spaced away from the mounting surface in such a way, it is possible to increase a distance from the mounting substrate, thus obtaining the advantageous effect of relaxing stress from the mounting substrate. Further, it is possible to increase the bottom thickness of external material 50, thus improving insulating properties.

Similarly to first extension portion 34*a*, a portion of the surface of second extension portion 36*a* may be processed to form a recess so that a base material of first metallic terminal 30*a* is exposed at the processed portion. This makes it possible, even if a bonding material on first terminal connecting portion 32*a* is melted, to stop the outflow of the bonding material because the wettability of the bonding material is reduced by exposure of the base material of first metallic terminal 30*a* in the recessed processed portion, thus preventing the melted bonding material from flowing out of external material 50.

Further, second extension portion 36*a* may include a notch (notches) in the center or approximate center thereof so as to have a two- or more-pronged shape. This makes it possible to obtain the advantageous effect of relaxing stress from the mounting substrate after substrate mounting.

Fourth extension portion 36*b* of second metallic terminal 30*b* is connected to third extension portion 34*b* and extends toward a mounting surface so that a gap is created between second main surface 14*b* to be opposed to the mounting surface and the mounting surface. This makes it possible to increase a distance from a mounting substrate, thus obtaining the advantageous effect of relaxing stress from the mounting substrate. Further, it is possible to increase the bottom thickness of external material 50, thus improving insulating properties. More specifically, fourth extension portion 36*b* curves from the end of third extension portion 34*b* and extends toward the mounting surface. The curved portion may have an obtuse angle or approximately a right angle.

The length of fourth extension portion 36*b* of second metallic terminal 30*b* along width direction Y of multi-layer ceramic electronic component 10A is not particularly limited, but is preferably, for example, equal or substantially equal to the length of third extension portion 34*b* along width direction Y of multi-layer ceramic electronic component 10A.

Fourth extension portion 36*b* extending toward the mounting surface preferably has a length such that, for example, a gap of greater than or equal to about 0.15 mm and less than or equal to about 2 mm is created between the surface of external material 50 (which will be described later) opposed to the mounting surface and the mounting surface. When multi-layer ceramic electronic component main body 12A covered with external material 50 is spaced away from the mounting surface in such a way, it is possible to increase a distance from the mounting surface, thus obtaining the advantageous effect of relaxing stress from the mounting substrate. Further, it is possible to increase the bottom thickness of external material 50, thus improving insulating properties.

Similar to third extension portion 34*b*, a portion of the surface of fourth extension portion 36*b* may be processed to form a recess so that a base material of second metallic terminal 30*b* is exposed at the processed portion. This makes it possible, even if a bonding material on second terminal connecting portion 32*b* is melted, to stop the outflow of the bonding material because the wettability of the bonding material is reduced by exposure of the base material of second metallic terminal 30*b* in the recessed processed portion, thus preventing the melted bonding material from flowing out of external material 50.

Further, fourth extension portion 36*b* may include a notch (notches) in the center or approximate center thereof so as to have a two- or more-pronged shape. This makes it possible to obtain the advantageous effect of relaxing stress from the mounting substrate after substrate mounting.

(d) First Mounting Portion and Second Mounting Portion

First mounting portion 38*a* of first metallic terminal 30*a* is connected to second extension portion 36*a* and extends parallel or substantially parallel to a mounting surface so as to be mounted on a mounting substrate.

First mounting portion 38*a* of first metallic terminal 30*a* may have a continuous rectangular or substantially rectangular shape. Further, first mounting portion 38*a* may include a notch (notches) in the center or approximate center thereof so as to have a two- or more-pronged shape. This makes it possible to reduce the amount of material of the metallic terminal, thus achieving the advantageous effect of reducing costs. Further, it is possible to obtain the advantageous effect of relaxing stress from a substrate after substrate mounting. When a notch is provided, a portion of first mounting portion 38*a* may be cut out in the center or approximate center of first mounting portion 38*a*, but the notch is preferably formed so that outermost ends of first mounting portion 38*a* are aligned with both ends of second extension portion 36*a*.

The length of first mounting portion 38*a* along width direction Y of multi-layer ceramic electronic component 10A is not particularly limited, but is preferably equal or substantially equal to the length of second extension portion 36*a* along width direction Y of multi-layer ceramic electronic component 10A.

The length of first mounting portion 38*a* along width direction Y of multi-layer ceramic electronic component 10A is preferably set, for example, so that "area of first mounting portion and second mounting portion (mm$^2$) ≥weight (g) of multi-layer ceramic electronic component× 2/cohesive force of solder" is satisfied. This makes it possible to achieve adequate adhesive strength between the mounting substrate and multi-layer ceramic electronic component 10A for the gravitational mass of multi-layer ceramic electronic component 10A, thus preventing multi-layer ceramic electronic component 10A from dropping from the mounting substrate. The cohesive force of solder refers to a force determined by a tensile test in which multi-layer ceramic electronic component 10A mounted on the mounting substrate is pulled until multi-layer ceramic electronic component 10A is detached from the mounting substrate due to peeling-off of solder used to mount multi-layer ceramic electronic component 10A from the mounting substrate or multi-layer ceramic electronic component 10A.

Second mounting portion 38*b* of second metallic terminal 30*b* is connected to fourth extension portion 36*b* and extends parallel or substantially parallel to a mounting surface so as to be mounted on a mounting substrate.

Second mounting portion 38*b* of second metallic terminal 30*b* may have a continuous rectangular or substantially rectangular shape. Further, second mounting portion 38*b* may include a notch in the center or approximate center thereof so as to have a two- or more-pronged shape. This makes it possible to reduce the amount of material of the metallic terminal, thus achieving the advantageous effect of reducing costs. Further, it is possible to obtain the advantageous effect of relaxing stress from a substrate after substrate mounting. When a notch is provided, a portion of second mounting portion 38*b* may be cut out in the center or approximate center of second mounting portion 38*b*, but the notch is preferably configured so that outermost ends of second mounting portion 38*b* are aligned with both ends of fourth extension portion 36*b*.

The length of second mounting portion 38*b* along width direction Y of multi-layer ceramic electronic component 10A is not particularly limited, but is preferably equal or substantially equal to the length of fourth extension portion 36*b* along width direction Y of multi-layer ceramic electronic component 10A.

The length of second mounting portion 38*b* along width direction Y of multi-layer ceramic electronic component 10A is preferably set, for example, so that "area of first mounting portion and second mounting portion (mm$^2$) ≥weight (g) of multi-layer ceramic electronic component× 2/cohesive force of solder" is satisfied. This makes it possible to achieve adequate adhesive strength between the mounting substrate and multi-layer ceramic electronic component 10A for the gravitational mass of multi-layer ceramic electronic component 10A, thus preventing multi-layer ceramic electronic component 10A from dropping from the mounting substrate. It is to be noted that the cohesive force of solder refers to a force determined by a tensile test in which multi-layer ceramic electronic component 10A mounted on the mounting substrate is pulled until multi-layer ceramic electronic component 10A is detached from the mounting substrate due to peeling-off of solder used for mounting multi-layer ceramic electronic component 10A from the mounting substrate or multi-layer ceramic electronic component 10A.

Metallic terminal 30 includes a terminal main body and a plating film on the surface of the terminal main body.

The terminal main body is preferably made of, for example, oxygen-free copper or a Cu-based alloy having high thermal conductivity. More specifically, the terminal main body may be made of, for example, oxygen-free copper or phosphor bronze. When the metallic terminal 30 is made of such a copper-based material having high thermal conductivity, lower thermal resistance can further be achieved. The thickness of the terminal main body of metallic terminal 30 is preferably greater than or equal to about 0.05 mm and less than or equal to about 0.5 mm, for example.

The plating film includes a lower plating film and an upper plating film. The lower plating film is provided on the surface of the terminal main body, and the upper plating film is provided on the surface of the lower plating film. Each of the lower plating film and the upper plating film may include two or more plating films.

The lower plating film is made of, for example, Ni, Fe, Cu, Ag, Cr or an alloy mainly including at least one of these metals. The lower plating film is preferably made of, for example, Ni, Fe, Cr or an alloy mainly including at least one of these metals.

The thickness of the lower plating film is preferably greater than or equal to about 0.2 μm and less than or equal to about 5.0 μm, for example.

The upper plating film is made of, for example, Sn, Ag, Au, or an alloy mainly including at least one of these metals. The upper plating film is preferably made of, for example, Sn or an alloy mainly including Sn. When the upper plating film is made of Sn or an alloy mainly including Sn, it is possible to improve solderability between metallic terminal 30 and external electrode 26.

The thickness of the upper plating film is preferably greater than or equal to about 1.0 μm and less than or equal to about 5.0 μm, for example.

Further, when the terminal main body and the lower plating film are each made of, for example, Ni, Fe, or Cr having a high melting point or an alloy mainly including at least one of these metals, it is possible to improve the heat resistance of metallic terminal 30.

Further, the plating film may not be provided at at least the peripheral surfaces of mounting portions 38a and 38b and extension portions 34a, 34b, 36a and 36b of metallic terminal 30. This makes it possible, when multi-layer ceramic electronic portion 10A is mounted with solder as a bonding material, to prevent the rising of wet solder to metallic terminal 30. Therefore, it is possible to prevent the rising of wet solder to a portion (floating portion) between multi-layer ceramic electronic component main body 12A and metallic terminal 30, thus preventing the floating portion from being filled with solder. Therefore, the space of the floating portion can sufficiently be maintained, which makes it possible to prevent transmission of vibration to the substrate, thus providing the advantageous effect of stably preventing squeaking of multi-layer ceramic electronic component 10A. The plating film may not be provided at the peripheral surface of metallic terminal 30 at all.

When the plating film at the peripheral surfaces of mounting portions 38a and 38b and extension portions 34a, 34b, 36a, and 36b of metallic terminal 30 or the plating film at the entire or substantially the entire peripheral surface of metallic terminal 30 is removed, the plating film can be removed by, for example, mechanical removal (cutting, grinding), removal by laser trimming, removal using a plating remover (e.g., sodium hydroxide), or a method in which a portion not to be plated is covered with a resist before formation of a plating film on metallic terminal 30, and then the resist is removed after formation of a plating film on metallic terminal 30.

(3) Bonding Material

First external electrode 26a and first metallic terminal 30a are connected to each other with a bonding material, and second external electrode 26b and second metallic terminal 30b are connected to each other with a bonding material.

The bonding material is preferably solder, particularly, for example, Pb-free solder having a high melting point. This makes it possible not only to improve bonding strength between multi-layer ceramic electronic component main body 12A and metallic terminal 30 but also to achieve the heat resistance of a joint at the temperature of flow or reflow soldering during substrate mounting.

The Pb-free solder having a high melting point is preferably, for example, Sn—Sb-based lead-free solder, Sn—Ag—Cu-based lead-free solder, Sn—Cu-based lead-free solder, or Sn—Bi-based lead-free solder. Among them, for example, Sn-10Sb-Sn-15Sb solder is preferable. This makes it possible to achieve the heat resistance of a joint during mounting.

(4) External Material

External material 50 covers multi-layer ceramic electronic component main body 12A, a portion of first metallic terminal 30a (first terminal connecting portion 32a and at least a portion of first extension portion 34a), and a portion of second metallic terminal 30b (second terminal connecting portion 32b and at least a portion of third extension portion 34b). This makes it possible to increase a range subjected to molding with external material 50, thus maintaining an insulating surface distance (creeping distance) between conductors. Further, molding with external material 50 makes it possible to avoid the risk of surface discharge.

At this time, gap 64 between multi-layer body 14 and external electrode 26 is also filled with external material 50.

The shape of external material 50 is not particularly limited, but external material 50 preferably has a quadrangular, substantially quadrangular, trapezoidal or substantially trapezoidal shape when viewed from the side.

External material 50 includes a first main surface 50a and a second main surface 50b respectively opposed to first main surface 14a and second main surface 14b of multi-layer ceramic electronic component main body 12A, a first side surface 50c and a second side surface 50d respectively opposed to first side surface 14c and second side surface 14d of multi-layer ceramic electronic component main body 12A, and a first end surface 50e and a second end surface 50f respectively opposed to first end surface 14e and second end surface 14f of multi-layer ceramic electronic component main body 12A. The shape of the corners of external material 50 is not particularly limited and may be round, for example.

First main surface 50a and second main surface 50b of external material 50 are preferably planar or substantially planar. This makes it possible to achieve adequate flatness, thus preventing suction error of a mounter of a mounting machine used to mount multi-layer ceramic electronic component 10A on a mounting substrate. Therefore, multi-layer ceramic electronic component 10A can be reliably mounted on the mounting substrate. As a result, it is possible to prevent the occurrence of mounting failure.

External material 50 is formed by, for example, coating with a resin such as a liquid or powdery silicone- or epoxy-based resin. Alternatively, external material 50 may be formed by, for example, injection molding or transfer molding of an engineering plastic. Particularly, for example, external material 50 is preferably made of a thermosetting epoxy resin. This makes it possible to improve adhesiveness between external material 50 and multi-layer ceramic electronic component main body 12A or metallic terminal 30 and to obtain the advantageous effect of improving voltage resistance and moisture resistance.

Here, the surfaces of multi-layer ceramic electronic component main body 12A located in a direction in which metallic terminal 30 extends are defined as a first end surface 10e and a second end surface 10f of multi-layer ceramic electronic component 10A. The surfaces of multi-layer ceramic electronic component 10A opposed to first main surface 14a and second main surface 14b of multi-layer ceramic electronic component main body 12A (surfaces opposed to a mounting surface) are defined as a first main surface 10a and a second main surface 10b of multi-layer ceramic electronic component 10A. The surfaces of multi-layer ceramic electronic component 10A opposed to first side surface 14c and second side surface 14d of multi-layer ceramic electronic component main body 12A are defined as a first side surface 10c and a second side surface 10d of multi-layer ceramic electronic component 10A.

The size of multi-layer ceramic electronic component 10A including multi-layer ceramic electronic component main body 12A, external material 50, first metallic terminal 30a, and second metallic terminal 30b in length direction Z is defined as a size L. In other words, the length of multi-layer ceramic electronic component 10A, which extends in a direction in which both the end surfaces 14e and 14f of multi-layer ceramic electronic component main body 12A are located, in length direction Z is defined as a size L. The size L is preferably greater than or equal to about 10 mm and less than or equal to about 15 mm, for example.

The size of multi-layer ceramic electronic component 10A including multi-layer ceramic electronic component main body 12A, external material 50, first metallic terminal 30a, and second metallic terminal 30b in width direction Y is defined as a size W. In other words, the length of multi-layer ceramic electronic component 10A, which extends in a direction in which both the side surfaces 14c and 14d of multi-layer ceramic electronic component main body 12A are located, in width direction Y is defined as a size W. The size W is preferably greater than or equal to about 3.0 mm and less than or equal to about 10.0 mm, for example.

The size of multi-layer ceramic electronic component 10A including multi-layer ceramic electronic component main body 12A, external material 50, first metallic terminal 30a, and second metallic terminal 30b in height direction X is defined as a size T. In other words, the length of multi-layer ceramic electronic component 10A, which extends in a direction in which both the main surfaces 14a and 14b of multi-layer ceramic electronic component main body 12A are located, in height direction X is defined as a size T. The size T is preferably greater than or equal to about 1.0 mm and less than or equal to about 5.5 mm, for example.

In multi-layer ceramic electronic component 10A, metallic terminal 30 is connected to second main surface 14b of multi-layer ceramic electronic component main body 12A, a portion of second main surface 14b is covered with first external electrode 26a and second external electrode 26b, gap 64 is provided between tip 60a of first external electrode 26a located at second main surface 14b and multi-layer body 14 and between tip 60b of second external electrode 26b located at second main surface 14b and multi-layer body 14, and external material 50 is positioned in gap 64. Therefore, even when external material 50 absorbs moisture before reflow soldering, stress is applied to tip 60a of first external electrode 26a and tip 60b of second external electrode 26b in a vertical direction in a good balance, which makes it possible to prevent separation between second main surface 14b of multi-layer body 14 and external material 50.

Further, in multi-layer ceramic electronic component 10A, first external electrode 26a and second external electrode 26b facing gap 64 include a plating layer, which reduces moisture absorbency of first external electrode 26a and second external electrode 26b. Therefore, even when external material 50 absorbs moisture before reflow soldering, stress is applied to tip 60a of first external electrode 26a and tip 60b of second external electrode 26b in a vertical direction in a good balance, which makes it possible to prevent separation between second main surface 14b and external material 50.

Further, in multi-layer ceramic electronic component 10A, the length of opening 66a or 66b of gap 64 in the height direction, which is a distance between tip 60a or 60b of external electrode 26 and second main surface 14b, is greater than or equal to about 0.2 μm and less than or equal to about 30 μm, for example. Therefore, stress to be generated is applied in a vertical direction in a good balance, which makes it possible to prevent separation between second main surface 14b of multi-layer body 14 and external material 50.

Further, in multi-layer ceramic electronic component 10A, the length of separated portion 68a or 68b of gap 64, which is a distance from tip 60a or 60b of external electrode 26 to a portion where external electrode 26 and second main surface 14b are in contact with each other (contact portion 62a 62b), is greater than or equal to about 2 μm and less than or equal to about 300 μm, for example. Therefore, stress to be generated is applied in a vertical direction in a good balance, which makes it possible to prevent separation between second main surface 14b of multi-layer body 14 and external material 50.

Second Preferred Embodiment

Figure 15:
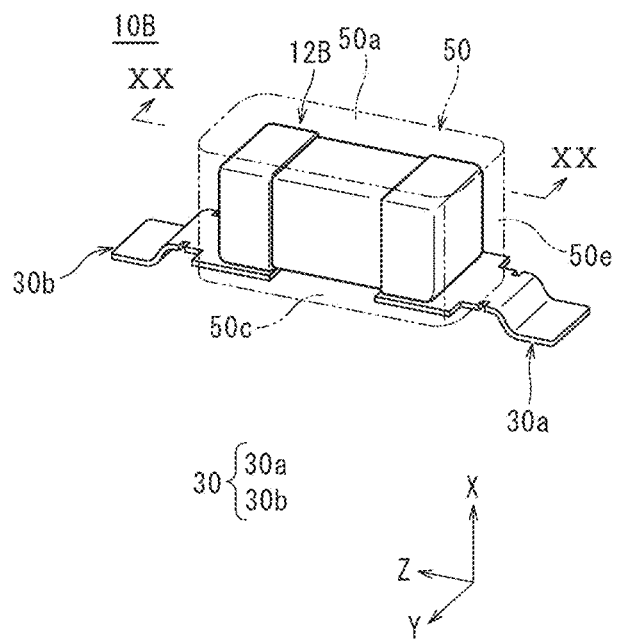
FIG. 15 is a perspective view showing an example of a multi-layer ceramic electronic component according to a second preferred embodiment of the present invention.
Figure 16:
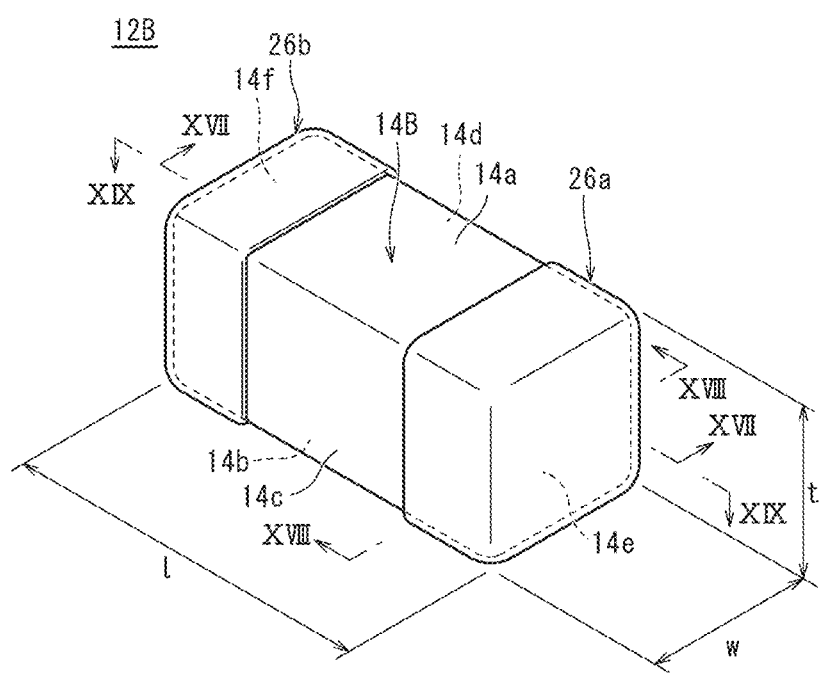
FIG. 16 is a perspective view showing a multi-layer ceramic electronic component main body used in the multi-layer ceramic electronic component shown in FIG. 15.
Figure 16:
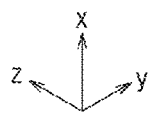
Figure 17:
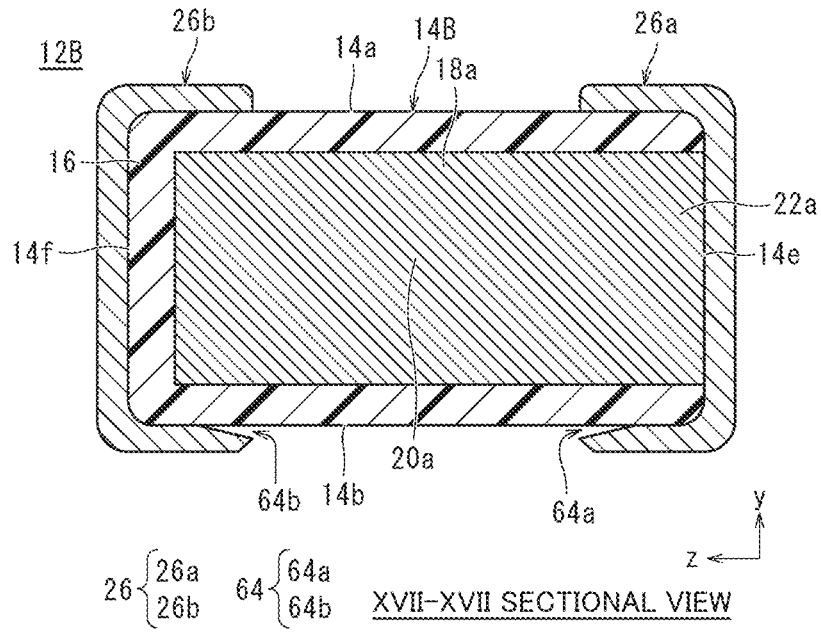
FIG. 17 is a sectional view of the multi-layer ceramic electronic component main body taken along a line XVII-XVII shown in FIG. 16.
Figure 18:
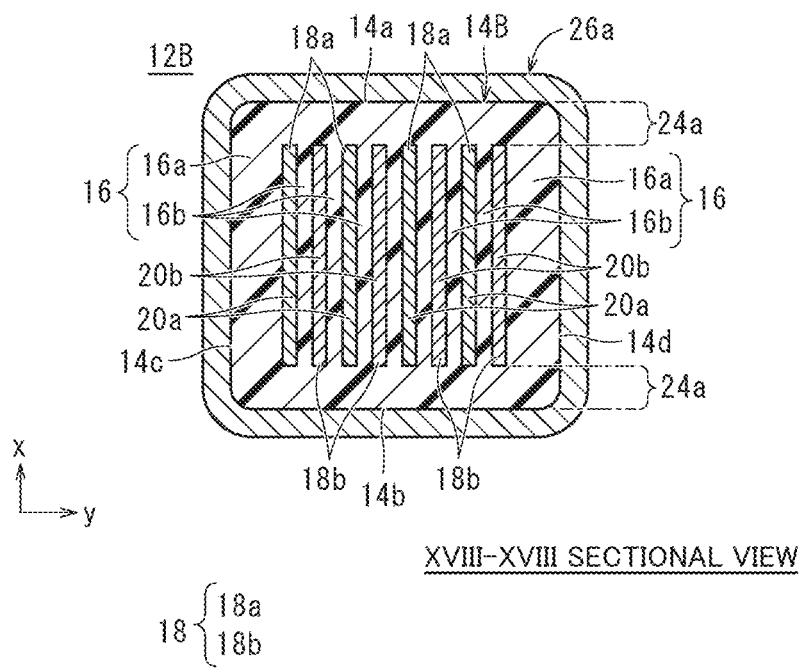
FIG. 18 is a sectional view of the multi-layer ceramic electronic component main body taken along a line XVIII-XVIII shown in FIG. 16.
Figure 19:
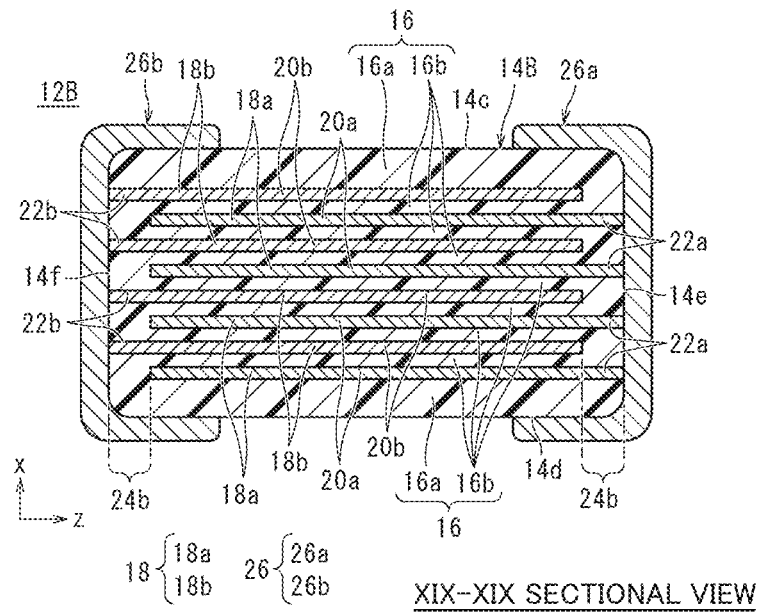
FIG. 19 is a sectional view of the multi-layer ceramic electronic component main body taken along a line XIX-XIX shown in FIG. 16.
Figure 20:
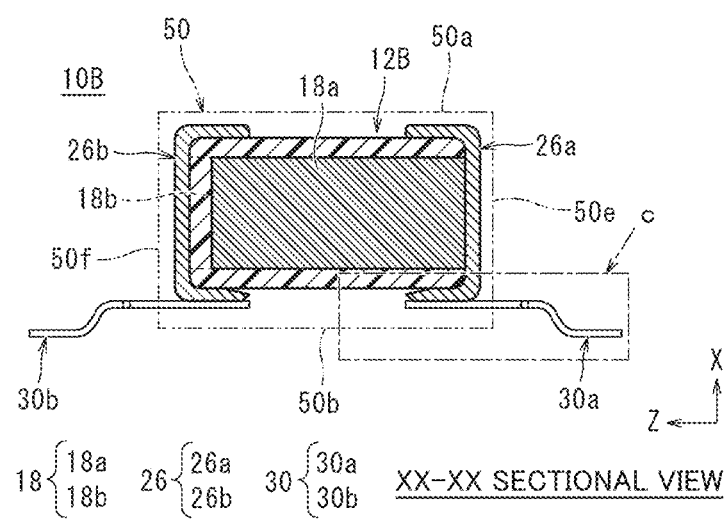
FIG. 20 is a sectional view of the multi-layer ceramic electronic component taken along a line XX-XX shown in FIG. 15.
Figure 21:
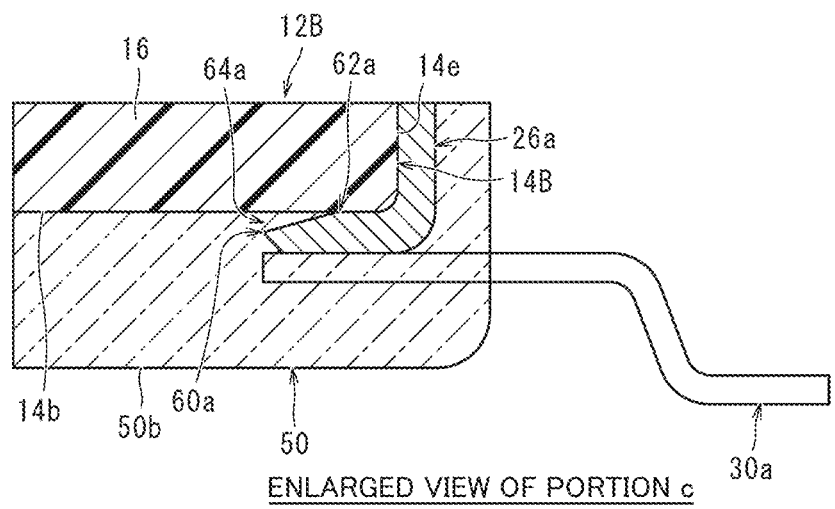
FIG. 21 is an enlarged view of a portion c shown in FIG. 20.
Figure 22:
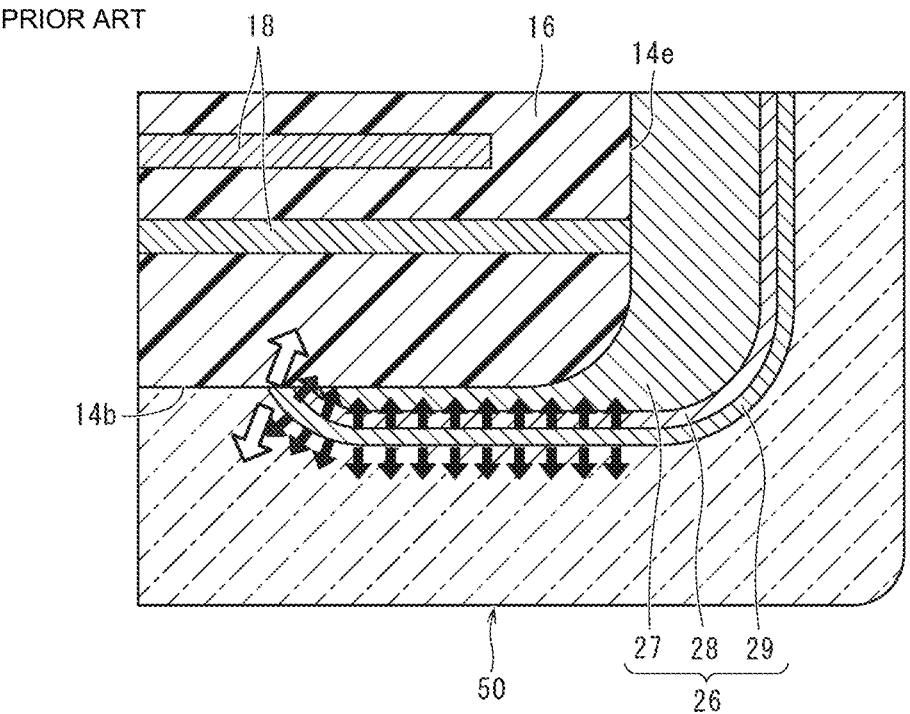
FIG. 22 is a partially-enlarged LT sectional view of a conventional multi-layer ceramic electronic component.

A multi-layer ceramic electronic component according to a second preferred embodiment of the present invention will be described. FIG. 15 is a perspective view of an example of the multi-layer ceramic electronic component according to the second preferred embodiment of the present invention. FIG. 16 is a perspective view showing a multi-layer ceramic electronic component main body used in the multi-layer ceramic electronic component shown in FIG. 15. FIG. 17 is a sectional view of the multi-layer ceramic electronic component main body taken along a line XVII-XVII shown in FIG. 16. FIG. 18 is a sectional view of the multi-layer ceramic electronic component main body taken along a line XVIII-XVIII shown in FIG. 16. FIG. 19 is a sectional view of the multi-layer ceramic electronic component main body taken along a line XIX-XIX shown in FIG. 16. FIG. 20 is a sectional view of the multi-layer ceramic electronic component taken along a line XX-XX shown in FIG. 15. FIG. 21 is an enlarged view of a portion c shown in FIG. 20.

A multi-layer ceramic electronic component 10B according to the second preferred embodiment of the present invention has the same or substantially the same structure as the multi-layer ceramic electronic component 10A described with reference to FIG. 1, except that inner electrode layers 18 of a multi-layer body 14B of a multi-layer ceramic electronic component main body 12B are perpendicular or substantially perpendicular to a second main surface 14b facing a mounting surface. Therefore, the same or corresponding elements as multi-layer ceramic electronic component 10A shown in FIG. 1 are denoted by the same reference numerals and will not be repeatedly described.

Multi-layer ceramic electronic component 10B according to the second preferred embodiment of the present invention includes a multi-layer ceramic electronic component main body 12B. Multi-layer ceramic electronic component main body 12B includes a cuboid-shaped multi-layer body 14B and an external electrode 26. Further, multi-layer ceramic electronic component 10B includes a metallic terminal 30 connected to external electrode 26 of multi-layer ceramic electronic component main body 12B, and an external material 50 covering multi-layer body 14B, external electrode 26, and portion of metallic terminal 30.

Multi-layer ceramic electronic component main body 12B includes multi-layer body 14B including a plurality of stacked ceramic layers 16, a first main surface 14a and a second main surface 14b opposed to each other in a height direction x, a first side surface 14c and a second side surface 14d opposed to each other in a width direction y orthogonal or substantially orthogonal to height direction x, and a first end surface 14e and a second end surface 14f opposed to each other in a length direction z orthogonal or substantially orthogonal to height direction x and width direction y.

Multi-layer body 14B includes stacked ceramic layers 16 and a plurality of internal electrode layers 18. Further, multi-layer body 14B includes first main surface 14a and second main surface 14b opposed to each other in height direction x, first side surface 14c and second side surface 14d opposed to each other in width direction y orthogonal or substantially orthogonal to height direction x, and first end surface 14e and second end surface 14f opposed to each other in length direction z orthogonal or substantially orthogonal to height direction x and width direction y. First main surface 14a and second main surface 14b of multi-layer body 14B refer to surfaces parallel or substantially parallel to a surface (mounting surface) on which multi-layer ceramic electronic component main body 12B is to be mounted. In the present preferred embodiment, second main surface 14b of multi-layer body 14B faces the surface (mounting surface) on which multi-layer ceramic electronic component main body 12B is mounted.

The corners and ridge lines of multi-layer body 14B are preferably rounded. The corner refers to a portion where three adjacent surfaces of multi-layer body 14B meet, and the ridge line refers to a portion where two adjacent surfaces of multi-layer body 14B meet.

The size of multi-layer ceramic electronic component main body 12B including multi-layer body 14B and external electrode 26 in length direction z is defined as a size l, the size of multi-layer ceramic electronic component main body 12B including multi-layer body 14B and external electrode 26 in height direction x is defined as a size t, and the size of multi-layer ceramic electronic component main body 12B including multi-layer body 14B and external electrode 26 in width direction y is defined as a size w.

Multi-layer body 14B includes an outer layer portion 16a including only ceramic layers 16 and an inner layer portion 16b including ceramic layers 16 and internal electrode layers 18. Outer layer portion 16a is located in a plane orthogonal or substantially orthogonal to width direction y as a stacking direction of multi-layer body 14B, and is an assembly of ceramic layers 16 located between first side surface 14c of multi-layer body 14B and internal electrode layer 18 nearest to first side surface 14c and ceramic layers 16 located between second side surface 14d and internal electrode layer 18 nearest to second side surface 14d. An area sandwiched between both outer layer portions 16a corresponds to inner layer portion 16b.

The material and thickness of ceramic layers 16 are the same or substantially the same as those of multi-layer ceramic electronic component 10A, and therefore will not repeatedly be described.

Multi-layer body 14B includes internal electrode layers 18. Internal electrode layers 18 include a plurality of first internal electrode layers 18a and a plurality of second internal electrode layers 18b. First internal electrode layers 18a and second internal electrode layers 18b are alternately stacked such that ceramic layers 16 are each interposed between first internal electrode layer 18a and second internal electrode layer 18b. More specifically, first internal electrode layers 18a and second internal electrode layers 18b are each provided on ceramic layers 16 different from each other.

Each of first internal electrode layers 18a includes a first opposite electrode portion 20a opposed to second internal electrode layer 18b and a first extraction electrode portion 22a located on one end side of first internal electrode layer 18a and extending from the end of first opposite electrode portion 20a to first end surface 14e of multi-layer body 14B. The end of first extraction electrode portion 22a extends beyond first end surface 14e so as to be exposed.

Each of second internal electrode layers 18b includes a second opposite electrode portion 20b opposed to first internal electrode layer 18a and a second extraction electrode portion 22b located on one end side of second internal electrode layer 18b and extending from the end of second opposite electrode portion 20b to second end surface 14f of multi-layer body 14B. The end of second extraction electrode portion 22b is exposed at second end surface 14f.

First opposite electrode portion 20a and second opposite electrode portion 20b create electrical characteristics (e.g., capacitance).

Multi-layer body 14B includes a side portion (W gap) 24a of multi-layer body 14B between one ends of first opposite electrode portions 20a and second opposite electrode portions 20b, where first internal electrode layers 18a and second internal electrode layers 18b are opposed to each other, in height direction x and first main surface 14a and between other ends of first opposite electrode portions 20a and second opposite electrode portions 20b in height direction x and second main surface 14b. Further, multi-layer body 14B includes an end portion (L gap) 24b of multi-layer body 14B between the ends of first internal electrode layers 18a on the opposite side from first extraction electrode portions 22a and second end surface 14f and between the ends of second internal electrode layers 18b on the opposite side from second extraction electrode portions 22b and first end surface 14e.

The material and thickness of internal electrode layers 18 are the same or substantially the same as those of multi-layer ceramic electronic component 10A, and therefore will not repeatedly be described.

External electrode 26 includes a first external electrode 26a and a second external electrode 26b.

First external electrode 26a is preferably provided on first end surface 14e and at least portion of second main surface 14b.

Second external electrode 26b is preferably provided on second end surface 14f and at least portion of second main surface 14b.

External electrode 26 includes a base electrode layer and a plating layer on the base electrode layer. The base electrode layer includes a baked layer.

The material and structure of the base electrode layer and the material and structure of the plating layer are the same or substantially the same as those of multi-layer ceramic electronic component 10A, and therefore will not repeatedly be described.

A gap 64 is provided between external electrode 26 and second main surface 14b of multi-layer body 14B. More specifically, a tip 60a of first external electrode 26a located at second main surface 14b of multi-layer body 14B is separated from second main surface 14b so that a first gap 64a is provided. Further, a tip 60b of second external electrode 26b located at second main surface 14b is separated from second main surface 14b so that a second gap 64b is provided.

Gap 64 is defined by first gap 64a and second gap 64b.

First gap 64a is an area between second main surface 14b of multi-layer body 14B and first external electrode 26a. First external electrode 26a is in contact with second main surface 14b of multi-layer body 14B at a first contact portion 62a. An area between tip 60a of first external electrode 26a and second main surface 14b of multi-layer body 14B in height direction x is defined as a first opening 66a, and a portion between tip 60 of first external electrode 26a and first contact portion 62a is defined as a first separated portion 68a. The length of first opening 66a of first gap 64a in height direction x is preferably greater than or equal to about 0.2 μm and less than or equal to about 30.0 μm, for example. This makes it possible to prevent separation between second main surface 14b of multi-layer body 14B and external material 50 because stress to be generated is applied in a vertical direction in a good balance. The length of first separated portion 68a of first gap 64a is preferably greater than or equal to about 2 μm and less than or equal to about 300 μm, for example. This makes it possible to prevent separation between second main surface 14b of multi-layer body 14B and external material 50 because stress to be generated is applied in a vertical direction in a good balance.

Second gap 64b is an area between second main surface 14b of multi-layer body 14B and second external electrode 26b. Second external electrode 26b is in contact with second main surface 14b of multi-layer body 14B at a second contact portion 62b. An area between tip 60b of second external electrode 26b and second main surface 14b of multi-layer body 14B in height direction x is defined as a second opening 66b, and a portion between tip 60b of second external electrode 26b and second contact portion 62b is defined as a second separated portion 68b. The length of second opening 66b of second gap 64b in height direction x is preferably greater than or equal to about 0.2 μm and less than or equal to about 30.0 μm, for example. This makes it possible to prevent separation between second main surface 14b of multi-layer body 14B and external material 50 because stress to be generated is applied in a vertical direction in a good balance. The length of second separated portion 68b of second gap 64b is preferably greater than or equal to about 2 μm and less than or equal to about 300 μm, for example. This makes it possible to prevent separation between second main surface 14b of multi-layer body 14B and external material 50 because stress to be generated is applied in a vertical direction in a good balance.

As described above, according to the prior art, there is a case where a bonding material (solder) or plating is melted when a multi-layer ceramic electronic component is mounted on the surface of a substrate by reflow soldering, and therefore boundary separation between the surface of a multi-layer body and an external material starts from the tip of each external electrode so that creeping discharge occurs on the surface of the multi-layer body after separation. This may result in a critical defect of a product. However, gap 64 provided between multi-layer body 14B and external electrode 26 cancels out stress generated when a bonding material (solder) or plating is melted, in a vertical direction relative to the separated base electrode layer, which makes it possible to stably achieve a state in which the multi-layer body and the external material are not separated from each other even after reflow soldering.

Further, in multi-layer ceramic electronic component main body 12B, first external electrode 26a and second external electrode 26b facing gap 64 preferably include a plating layer. This reduces the moisture absorbency of first external electrode 26a and second external electrode 26b. Therefore, even when external material 50 absorbs moisture before reflow soldering, separation between second main surface 14b and external material 50 can be prevented because stress is applied to tip 60a of first external electrode 26a and tip 60b of second external electrode 26b in a vertical direction in a good balance.

2. Method for Producing Multi-Layer Ceramic Electronic Component

Hereinbelow, a preferred embodiment of a method for producing a multi-layer ceramic electronic component having such a structure as described above will be described with reference to a case where multi-layer ceramic electronic component 10A is produced. The following description will be provided with reference to a case, for example, where multi-layer ceramic electronic component main body 12A is a multi-layer ceramic capacitor.

(1) Method for Producing Multi-Layer Ceramic Electronic Component Main Body

First, a dielectric sheet and an electrically conductive paste for internal electrode are prepared. The dielectric sheet is produced by applying a ceramic paste including a ceramic powder by, for example, screen printing or the like to form a sheet and drying the sheet. The dielectric sheet and the electrically conductive paste for internal electrode include a binder and a solvent. As such binder and solvent, known organic binder and organic solvent may be used.

Then, the electrically conductive paste for internal electrode is applied in a predetermined pattern onto the dielectric sheet by, for example, screen printing, gravure printing, or the like to form an internal electrode pattern.

Then, a predetermined number of dielectric sheets for outer layer including no internal electrode pattern are stacked, dielectric sheets including an internal electrode pattern are stacked thereon one after another, and a predetermined number of dielectric sheets including no internal electrode pattern are further stacked. In this way, stacked sheets are produced. At this time, the dielectric sheets including an internal electrode pattern formed by printing are stacked so that the extraction pars of the internal electrode patterns alternate.

Then, the stacked sheets are pressure bonded in a stacking direction (height direction) by a pressure bonding such as, for example, a hydrostatic press to form a multi-layer block.

Then, the multi-layer block is cut to obtain a piece with a predetermined geometry as a raw multi-layer body chip. At this time, the raw multi-layer body chip may be subjected to barrel polishing so that the corners or ridge lines of the multi-layer body are rounded.

Then, the raw multi-layer body chip cut from the multi-layer block is fired so that a multi-layer body 14A is produced in which first internal electrode layers 18a and second internal electrode layers 18b are provided, first internal electrode layers 18a are exposed at a first end surface 14e, and second internal electrode layers 18b are exposed at a second end surface 14f. The firing temperature of the raw multi-layer body chip depends on the material of ceramic or the material of the electrically conductive paste for internal electrode, but is preferably higher than or equal to about 900° C. and lower than or equal to about 1300° C., for example.

Then, an electrically conductive paste for external electrode is applied onto both end surfaces 14e and 14f of multi-layer body 14A and baked to form a baked layer as a base electrode layer of an external electrode 26. The baking temperature is preferably higher than or equal to about 700° C. and lower than or equal to about 900° C., for example. Then, multi-layer body 14A is immersed in pure water for, for example, longer than or equal to about 0.02 hours and shorter than or equal to about 3 hours to remove portion of a glass phase of the baked layer. When an electrically conductive paste including a large amount of a glass component is used as the electrically conductive paste for external electrode, a glass phase is formed between multi-layer body 14A and external electrode 26. The glass phase is dissolved in pure water, and therefore the lengths of openings 66a and 66b and the lengths of separated portions 68a and 68b can be adjusted by controlling the amount of glass included in the electrically conductive paste for external electrode and the time of immersion into pure water after baking of the external electrode.

Then, a plating layer is formed on the surface of the base electrode layer. In this way, external electrode 26 is formed. A multi-layer ceramic electronic component main body 12A shown in FIG. 2 includes an Ni plating layer and an Sn plating layer as a plating layer formed on the base electrode layer. The Ni plating layer and the Sn plating layer are formed one by one by, for example, electrolytic plating or non-electrolytic plating.

In such a way as describe above, multi-layer ceramic electronic component main body 12A shown in FIG. 2 is produced.

(2) Method for Attaching Metallic Terminal

Hereinbelow, the step of attaching a metallic terminal 30 to multi-layer ceramic electronic component main body 12A will be described.

First, a first metallic terminal 30a and a second metallic terminal 30b are prepared.

Then, metallic terminals 30 are attached to external electrodes 26 of multi-layer ceramic electronic component main body 12A with a bonding material. Here, solder is used as the bonding material. Heat is applied by reflow soldering at a soldering temperature of, for example, higher than or equal to about 270° C. and lower than or equal to about 290° C. for longer than or equal to about 30 seconds.

(3) Method for Forming External Material

Then, an external material 50 is formed on a multi-layer ceramic electronic component 10A. External material 50 is formed by, for example, transfer molding. More specifically, a mold is filled with a resin of external material 50, the multi-layer ceramic electronic component before forming external material 50 is placed therein, and the resin is cured so that external material 50 is provided at a predetermined position.

Then, an unnecessary portion of metallic terminal 30 is cut. The cutting of metallic terminal 30 is performed using, for example, a cutting die.

Then, metallic terminal 30 is bent into a desired shape. The bending of metallic terminal 30 is performed using, for example, a bending die so that metallic terminal 30 is bend into a desired shape.

In such a way as describe above, multi-layer ceramic electronic component 10A shown in FIG. 1 is produced.

3. Experimental Examples

Multi-layer ceramic electronic components according to Examples 1 to 8 were produced in accordance with the above-described production method, and the presence or absence of separation between a second main surface of a multi-layer body and an external material and the presence or absence of mounting failure were determined. As a Comparative Example, a multi-layer ceramic electronic component including no gaps was produced, and measurement was performed in the same or substantially the same manner as in Examples.

(1) Production Conditions of Samples in Examples

First, multi-layer ceramic electronic components having the following specifications were produced in accordance with the above-described multi-layer ceramic electronic component production method to produce samples according to Examples 1 to 8.

Size of multi-layer ceramic electronic component L×W×T (design value, including metallic terminals): about 11.5 mm×about 6.2 mm×about 3.0 mm Capacitance: about 0.22 µF Rated voltage: about 630 V Number of multi-layer ceramic electronic component main bodies: 1

Metallic terminal

Terminal main body: SUS430

Plating film: two-layer structure including Ni plating layer and Sn plating layer External material: epoxy resin Multi-layer ceramic capacitors as multi-layer ceramic electronic component main bodies included in multi-layer ceramic electronic components of Examples 1 to 8 have the following specifications.

Size of multi-layer ceramic electronic component main body l×w×t (design value): about 5.7 mm×about 5.0 mm×about 2.0 mm Material of ceramic layers: $BaTi_2O_3$ Capacitance: about 0.22 µF Rated voltage: about 630 V Material of internal electrode layers: Ni External electrode Base electrode layer: electrode containing Cu and glass Plating layer: two-layer structure including Ni plating layer (thickness: about 3.5 µm) and Sn plating layer (thickness: about 3.5 µm)

(2) Method for Evaluating Characteristics (a) Method for Measuring Separation Between Second Main Surface of Multi-Layer Body and External Material In Examples 1 to 8 and Comparative Example, each of the samples was cut along the LT plane at a position of about ½W and polished to determine the presence or absence of separation between the second main surface and the external material at the tip of the external electrode. Further, the distance from the tip of the external electrode to the second main surface was measured by a digital microscope as the length of an opening. Further, the distance from the tip of the external electrode to a portion where the external electrode was in contact with the second main surface (contact portion) was measured by a digital microscope as the length of a separated portion.

(b) Method for Determining Mounting Failure

In Examples 1 to 8 and Comparative Example, the samples were mounted to a mounting substrate by reflow soldering using solder as a bonding material, and the contact state of mounting portions of the terminals was determined. When the metallic terminals were fixed to the lands of a mounting substrate with solder, the contact state was evaluated as excellent, and when the metallic terminals were not fixed, the contact state was evaluated as poor.

The measurement results of Examples 1 to 8 and Comparative Example are shown in Table 1.

The above results confirmed that the above-described two problems could be solved by setting the length of opening of the external electrode to greater than or equal to about 0.2 µm and less than or equal to about 30 µm and setting the length of separated portion of the external electrode to greater than or equal to about 2 µm and less than or equal to about 300 µm as in the case of the samples of Examples 2 to 6. This is because when the external electrode is in close contact with the ceramic layer of the second main surface, stress caused by solder (bonding material) or plating melted during reflow soldering works to cause separation between the multi-layer body and the external material. On the other hand, when the external electrode is separated from the second main surface of the multi-layer body, it is considered that the same stress is applied from both the inside and

TABLE 1

|  | Comparative Example | Example 1 | Example 2 | Example 3 | Example 4 | Example 5 | Example 6 | Example 7 | Example 8 |
|---|---|---|---|---|---|---|---|---|---|
| Time of immersion in pure water [h] | 0.0 | 0.01 | 0.02 | 0.2 | 0.5 | 1.0 | 3.0 | 4.0 | 5.0 |
| Length of opening [µm] | 0 | 0.1 | 0.2 | 2 | 5 | 10 | 30 | 40 | 50 |
| Length of separated portion [µm] | 0 | 1 | 2 | 20 | 50 | 100 | 300 | 400 | 500 |
| Number of samples in which separation between second main surface and external material occurred | 8 samples/ 10 samples | 2 samples/ 10 samples | 0 samples/ 10 samples | 0 samples/ 10 samples | 0 samples/ 10 samples | 0 samples/ 10 samples | 0 samples/ 10 samples | 0 samples/ 10 samples | 0 samples/ 10 samples |
| Number of samples that caused mounting failure | 0 samples/ 10 samples | 0 samples/ 10 samples | 0 samples/ 10 samples | 0 samples/ 10 samples | 0 samples/ 10 samples | 0 samples/ 10 samples | 0 samples/ 10 samples | 3 samples/ 10 samples | 5 samples/ 10 samples |

As shown in Table 1, the samples of Examples 2 to 6 had gaps between the multi-layer body and the tip of the first external electrode covering portion of the second main surface of the multi-layer body and between the multi-layer body and the tip of the second external electrode covering portion of the second main surface of the multi-layer body, and the length of the opening in the height direction, which is a distance between the tip of the external electrode and the second main surface, was greater than or equal to about 0.2 µm and less than or equal to about 30 µm. Therefore, separation between the second main surface and the external material did not occur, and mounting failure did not occur.

In the case of the samples of Examples 7 and 8 whose length of the separated portion was greater than or equal to about 400 µm, the metallic terminals were obliquely soldered and, therefore, solder bonding failure occurred. Further, in the case of the samples of Example 1 whose length of the opening after reflow soldering was about 0.1 µm, boundary separation between the second main surface of the multi-layer ceramic capacitor and the external material occurred.

On the other hand, in the case of the samples of Comparative Example whose multi-layer ceramic electronic component main body includes no gaps, stress caused by solder (bonding material) or plating considered to be melted during reflow soldering worked to cause separation between the multi-layer body and the external material, and therefore separation between the second main surface of the multi-layer body and the external material occurred in 8 out of the 10 samples.

outside of the separated portion and therefore stress is cancelled out, that is, stress causing separation between the multi-layer body and the external material is not generated so that a state where separation of the external material from the multi-layer body does not occur can be maintained.

Further, it was confirmed that, when the length of opening of the external electrode was set to greater than or equal to about 0.2 µm and less than or equal to about 30 µm and the length of separated portion of the external electrode was set to greater than or equal to about 2 µm and less than or equal to about 300 µm, separation between second main surface 14b and external material 50 did not occur during reflow soldering and, therefore, creeping discharge could be prevented and metallic terminal 30 was prevented from being obliquely bonded by reflow soldering, making it possible to stably mount the multi-layer ceramic electronic component on a substrate.

The present invention has been described above with reference to the preferred embodiments, but the present invention is not limited thereto.

That is, various changes in components, shape, material, numerical quantity, position, configuration, etc. may be made to the above-described preferred embodiments without departing from the technical idea and scope of the present invention and are encompassed by the present invention.

It is to be noted that in the above-described preferred embodiments, gap 64 is provided between second main surface 14b as a mounting surface-side main surface of the multi-layer body and external electrode 26, but gap 64 may also be provided between first main surface 14a as a main surface of the multi-layer body opposite to the mounting surface-side main surface and external electrode 26.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multi-layer ceramic electronic component comprising:
    a multi-layer ceramic electronic component main body including:
        a multi-layer body including a plurality of stacked ceramic layers, a plurality of stacked internal electrode layers, a first main surface and a second main surface opposed to each other in a height direction, a first side surface and a second side surface opposed to each other in a width direction orthogonal or substantially orthogonal to the height direction, and a first end surface and a second end surface opposed to each other in a length direction orthogonal or substantially orthogonal to the height direction and the width direction;
        a first external electrode on a side where the first end surface is located; and
        a second external electrode on a side where the second end surface is located, the multi-layer body;
    a first metallic terminal connected to the first external electrode; and
    a second metallic terminal connected to the second external electrode; wherein
    the multi-layer ceramic electronic component main body and at least a portion of the first metallic terminal and the second metallic terminal are covered with an external material;
    the second main surface is connected to the metallic terminals;
    the first external electrode and the second external electrode cover a portion of the second main surface;
    a gap is provided between the multi-layer body and each of tips of the first external electrode and the second external electrode that cover the portion of the second main surface; and
    the external material is in the gap.

2. The multi-layer ceramic electronic component according to claim 1, wherein the first external electrode and the second external electrode facing the gap include a plating layer.

3. The multi-layer ceramic electronic component according to claim 1, wherein a length of an opening of the gap in the height direction, which is a distance between the tip of the first external electrode and the second main surface, and a distance between the tip of the second external electrode and the second main surface, is greater than or equal to about 0.2 μm and less than or equal to about 30 μm.

4. The multi-layer ceramic electronic component according to claim 1, wherein a length of a separated portion of the gap, which is a distance from the tip of the first external electrode to a contact portion between the first external electrode and the second main surface, and a distance from the tip of the second external electrode to a contact portion between the second external electrode and the second main surface, is greater than or equal to about 2 μm and less than or equal to about 300 μm.

5. The multi-layer ceramic electronic component according to claim 1, wherein corners and ridges of the multi-layer body are rounded.

6. The multi-layer ceramic electronic component according to claim 1, wherein the plurality of ceramic layers include a dielectric ceramic including at least one of $BaTiO_3$, $CaTiO_3$, $SrTiO_3$, or $CaZrO_3$ as a main component.

7. The multi-layer ceramic electronic component according to claim 6, wherein the plurality of ceramic layers include at least one of an Mn compound, an Fe compound, a Cr compound, a Co compound, or an Ni compound in an amount less than that of the main component.

8. The multi-layer ceramic electronic component according to claim 1, wherein a thickness of each of the plurality of ceramic layers is greater than or equal to about 0.5 μm and less than or equal to about 20.0 μm.

9. The multi-layer ceramic electronic component according to claim 1, wherein the plurality of internal electrode layers include at least one of Ni, Cu, Ag, Pd, or Au or an alloy including at least one of Ni, Cu, Ag, Pd, or Au.

10. The multi-layer ceramic electronic component according to claim 1, wherein a thickness of each of the plurality of internal electrode layers is greater than or equal to about 0.1 μm and less than or equal to about 2.0 μm.

11. The multi-layer ceramic electronic component according to claim 1, wherein each of the first and second external electrodes includes a base electrode layer and a plating layer on the base electrode layer.

12. The multi-layer ceramic electronic component according to claim 11, wherein the base electrode layer includes a baked layer.

13. The multi-layer ceramic electronic component according to claim 12, wherein the baked layer includes glass and a metal.

14. The multi-layer ceramic electronic component according to claim 13, wherein the glass includes at least one of B, Si, Ba, Mg, Al, or Li.

15. The multi-layer ceramic electronic component according to claim 13, wherein the metal includes at least one of Cu, Ni, Ag, Pd, an Ag—Pd alloy, or Au.

16. The multi-layer ceramic electronic component according to claim 12, wherein the baked layer has a thickness of greater than or equal to about 10 μm and less than or equal to about 50 μm.

17. The multi-layer ceramic electronic component according to claim 11, wherein the plating layer includes at least one of Cu, Ni, Sn, Ag, Pd, or Ag—Pd alloy, Au.

18. The multi-layer ceramic electronic component according to claim 11, wherein the plating layer includes a Ni plating layer and an Sn plating layer on the Ni plating layer.

19. The multi-layer ceramic electronic component according to claim 11, wherein the plating layer has a thickness of greater than or equal to about 1 μm and less than or equal to about 15 μm.

* * * * *